(12) United States Patent
Lee et al.

(10) Patent No.: US 11,516,667 B2
(45) Date of Patent: Nov. 29, 2022

(54) AGGREGATE DATA PROVENANCE

(71) Applicant: QUALCOMM Incorporated, San Diego, CA (US)

(72) Inventors: Soo Bum Lee, San Diego, CA (US); Jay Rodney Walton, Waban, MA (US); John Wallace Nasielski, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 16/866,470

(22) Filed: May 4, 2020

(65) Prior Publication Data

US 2020/0359222 A1 Nov. 12, 2020

Related U.S. Application Data

(60) Provisional application No. 62/844,246, filed on May 7, 2019.

(51) Int. Cl.
*H04W 12/10* (2021.01)
*H04W 12/06* (2021.01)

(52) U.S. Cl.
CPC ......... *H04W 12/10* (2013.01); *H04W 12/06* (2013.01)

(58) Field of Classification Search
CPC ... H04W 12/10; H04W 12/06; H04W 12/108; H04W 12/02; H04W 12/35; H04W 12/76; H04L 63/104; H04L 2209/46; H04L 2209/805; H04L 63/126; H04L 9/085; H04L 9/3242; H04L 9/3247; H04L 63/0428; H04L 63/0876; H04L 63/123; G06F 21/64
See application file for complete search history.

(56) References Cited

U.S. PATENT DOCUMENTS

| | | | |
|---|---|---|---|
| 2016/0119768 A1* | 4/2016 | Sharma | H04W 8/005 455/435.1 |
| 2019/0044726 A1* | 2/2019 | Macieira | H04L 41/5003 |
| 2020/0084048 A1* | 3/2020 | Lindell | H04L 9/3255 |
| 2021/0112068 A1* | 4/2021 | Harris | H04L 63/104 |

OTHER PUBLICATIONS

Sultana et al., "A Lightweight Secure Provenance Scheme for Wireless Sensor Networks", IEEE 18th International Conference on Parallel and Distributed Systems (Year: 2012).*

(Continued)

*Primary Examiner* — Henry Tsang
(74) *Attorney, Agent, or Firm* — Holland & Hart LLP

(57) ABSTRACT

Methods, systems, and devices for communications are described. A device or a group of devices may generate data. The group of devices may receive a group profile from a node that identifies the devices to be included, and the group profile may include a function to be evaluated at each of the devices. The node may also provision evaluation parameters which may allow the device to provide authenticated aggregate data to a requesting third party, without sharing the data between the devices and without sharing the data with the node, thus concurrently maintaining individual data privacy and data provenance.

28 Claims, 17 Drawing Sheets

(56) References Cited

OTHER PUBLICATIONS

International Search Report and Written Opinion—PCT/US2020/031468—ISA/EPO—dated Aug. 17, 2020.
Sultana S.N., et al., "A Lightweight Secure Provenance Scheme for Wireless Sensor Networks", Parallel and Distributed Syatem (ICPADS), 2012 IEEE 18th International Conference on, IEEE, Dec. 17, 2012 (Dec. 17, 2012), pp. 101-108, XP032311068, 8 pages, DOI: 10.1109/ICPADS.2012.24 ISBN: 978-1-4673-4565-1 p. 101-p. 105, figures 1b,2,3.

\* cited by examiner

AGGREGATE DATA PROVENANCE

CROSS REFERENCE

The present application for Patent claims the benefit of U.S. Provisional Patent Application No. 62/844,246 by LEE et al., entitled "AGGREGATE DATA PROVENANCE," filed May 7, 2019, assigned to the assignee hereof, and expressly incorporated by reference herein.

BACKGROUND

The following relates generally to wireless communications, and more specifically to determining and providing aggregate data provenance.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Smart devices such as cell phones, tablets, computers, cars, and home appliances are ubiquitous. Each of these devices have the ability to produce data and may connect to the internet to communicate with one another and to transmit the data to other devices and systems. Due to the capability of these devices to create or join a network with each other, the devices may be referred to as Internet of Things devices. In some examples, the data generated at these devices may be confidential data and the receiver of the data may want to verify the authenticity of the data. In some cases, the data may be received directly from a device and the device may authenticate the generated data with a signature. In other cases, the data may be created by multiple devices such as relative location data or an average value. Although current techniques provide for authentication of data from a single device, due to the varying factors of collective generated data, an improved method of collective data authentication may be desired.

SUMMARY

The described techniques relate to improved methods, systems, devices, and apparatuses that support efficient secure multiparty computation. Generally, the described techniques provide for provisioning a group profile and evaluation parameters for use in verifying the provenance of collectively generated data. In some examples, the group profile and provisioned evaluation parameters may be used in evaluating collective data of a device group or user equipment (UE) group without sharing any of the individual data generated at each of the devices or between the devices, and also without sharing any of the individual data generated at each of the devices with the node.

In some examples, a device may identify that the device is to provide collective data provenance information for data generated at the device and at other devices, with a first portion of the data being generated at the device and with additional portions of the data being generated at other devices. The device may receive a group profile from the node, which identifies the other devices to be included in collective data provenance generation with the device. The device may then receive a group profile and a plurality of evaluation parameters from the node for generating collective data provenance information. A device specific output may be generated by the device and it may be based at least in part on the first portion of the data, the additional portions of the data, and on the plurality of evaluation parameters. Additionally, a collective data verification parameter may be generated by the device.

A method of communication at a device is described. The method may include identifying that the device is to provide collective data provenance information for data generated at the device and at other devices, with a first portion of the data being generated at the device and with additional portions of the data being generated at the other devices, and may also include receiving a group profile which identifies the other devices to be included in collective data provenance generation with the device. The method may include receiving, from a node associated with an owner of the device and of the other devices, a set of evaluation parameters for generating collective data provenance information, the set of evaluation parameters being independent of the first portion of the data and the additional portions of the data, and may also include generating a device specific output of the collective data provenance information based on the first portion of the data and on the set of evaluation parameters. Additionally, the method may include generating a collective data verification parameter.

An apparatus for communication at a device is described. The apparatus may include a processor, memory in electronic communication with the processor, and instructions stored in the memory. The instructions may be executable by the processor to cause the apparatus to identify that the device is to provide collective data provenance information for data generated at the device and at other devices, with a first portion of the data being generated at the device and with additional portions of the data being generated at the other devices, and may also cause the apparatus to receive a group profile which identifies the other devices to be included in collective data provenance generation with the device. The instructions may be executable by the processor to cause the apparatus to receive, from a node associated with an owner of the device and of the other devices, a set of evaluation parameters for generating collective data provenance information, the set of evaluation parameters being independent of the first portion of the data and the additional portions of the data, and may cause the apparatus to generate a device specific output of the collective data provenance information based on the first portion of the data and on the set of evaluation parameters. Additionally, the instructions may be executable by the processor to cause the apparatus to generate a collective data verification parameter.

Another apparatus for communication at a device is described. The apparatus may include means for identifying that the device is to provide collective data provenance information for data generated at the device and at other devices, with a first portion of the data being generated at the device and with additional portions of the data being generated at the other devices, and may include means for receiving a group profile which identifies the other devices to be included in collective data provenance generation with the device. The apparatus may include means for receiving, from a node associated with an owner of the device and of the other devices, a set of evaluation parameters for generating collective data provenance information, the set of evaluation parameters being independent of the first portion of the data and the additional portions of the data, and may include means for generating a device specific output of the collective data provenance information based on the first portion of the data and on the set of evaluation parameters. Additionally, the apparatus may include means for generating a collective data verification parameter.

A non-transitory computer-readable medium storing code for communication at a device is described. The code may include instructions executable by a processor to identify that the device is to provide collective data provenance information for data generated at the device and at other devices, with a first portion of the data being generated at the device and with additional portions of the data being generated at the other devices, and may receive a group profile which identifies the other devices to be included in collective data provenance generation with the device. The code may also include instructions executable by a processor to receive, from a node associated with an owner of the device and of the other devices, a set of evaluation parameters for generating collective data provenance information, the set of evaluation parameters being independent of the first portion of the data and the additional portions of the data, and may generate a device specific output of the collective data provenance information based on the first portion of the data and on the set of evaluation parameters, and may also generate a collective data verification parameter.

In some examples of the method, apparatuses, and non-transitory computer-readable medium described herein, receiving the set of evaluation parameters further may include operations, features, means, or instructions for receiving, at the device, a shared random parameter, a MAC key parameter, and a MAC on the shared random parameter.

In some examples of the method, apparatuses, and non-transitory computer-readable medium described herein, identifying that the device may be to provide collective data provenance information further may include operations, features, means, or instructions for receiving, from the node, an indication to generate an output at each of the devices.

Some examples of the method, apparatuses, and non-transitory computer-readable medium described herein may further include operations, features, means, or instructions for generating the output that may be a sum of individual values at each of the devices, based on receiving the indication to produce the output at each of the devices.

In some examples of the method, apparatuses, and non-transitory computer-readable medium described herein, identifying that the device may be to provide collective data provenance information further may include operations, features, means, or instructions for identifying that a predetermined event may have occurred, where the predetermined event triggers producing an output at each of the devices.

Some examples of the method, apparatuses, and non-transitory computer-readable medium described herein may further include operations, features, means, or instructions for evaluating a function at the device to produce an output, by using the received evaluation parameters, based on the first portion of the data being generated at the device.

Some examples of the method, apparatuses, and non-transitory computer-readable medium described herein may further include operations, features, means, or instructions for sharing the function evaluated at the device and between each of the devices, based on evaluating the function at the device, sharing, at the device and between each of the devices, at least one of the received evaluation parameters for the device, based on sharing the function evaluated at the device, and locally evaluating the function at each of the devices to produce respective outputs, based on the shared evaluated function at the device and the locally received evaluation parameters at each of the devices.

In some examples of the method, apparatuses, and non-transitory computer-readable medium described herein, the receiving the set of evaluation parameters being independent of the first portion of the data and the additional portions of the data, further may include operations, features, means, or instructions for locally generating a MAC share at each of the devices by using the locally received evaluation parameters for each of the devices, sharing, at the device and between each of the devices, each of the locally generated MAC shares, and sharing at least one of the received evaluation parameters for the other devices.

Some examples of the method, apparatuses, and non-transitory computer-readable medium described herein may further include operations, features, means, or instructions for verifying an authenticity of the data collectively generated by each of the devices by combining each of the outputs of the functions evaluated at each of the devices, based at least in part on the collective data verification parameter.

Some examples of the method, apparatuses, and non-transitory computer-readable medium described herein may further include operations, features, means, or instructions for signing the data using the collective data provenance information.

Some examples of the method, apparatuses, and non-transitory computer-readable medium described herein may further include operations, features, means, or instructions for reporting the data signed with the collective data provenance information, to a server.

In some examples of the method, apparatuses, and non-transitory computer-readable medium described herein, receiving the group profile further may include operations, features, means, or instructions for identifying group profile parameters used for generating collective data at the devices, and determining, based on the identified group profile parameters, how the device and the other devices may be to generate collective data provenance information.

In some examples of the method, apparatuses, and non-transitory computer-readable medium described herein, the collective data verification parameter comprises a message authentication code (MAC) share of the device and a plurality of assessment parameters A method of communication at a node is described. The method may include identifying a device group, for collectively providing data provenance information for data generated at the device group, to a third party, provisioning a group profile, from the node, to the device group, receiving, at the node, data from the device group, with individual portions of the data being generated at individual devices, and provisioning, to the device group, a set of evaluation parameters for generating collective data provenance information, the set of evaluation parameters being independent of the individual portions of the data.

An apparatus for communication at a node is described. The apparatus may include a processor, memory in electronic communication with the processor, and instructions stored in the memory. The instructions may be executable by the processor to cause the apparatus to identify a device group, for collectively providing data provenance information for data generated at the device group, to a third party, provision a group profile, from the node, to the device group, receive, at the node, data from the device group, with individual portions of the data being generated at individual devices, and provision, to the device group, a set of evaluation parameters for generating collective data provenance information, the set of evaluation parameters being independent of the individual portions of the data.

Another apparatus for communication at a node is described. The apparatus may include means for identifying a device group, for collectively providing data provenance information for data generated at the device group, to a third party, provisioning a group profile, from the node, to the device group, receiving, at the node, data from the device group, with individual portions of the data being generated at individual devices, and provisioning, to the device group, a set of evaluation parameters for generating collective data provenance information, the set of evaluation parameters being independent of the individual portions of the data.

A non-transitory computer-readable medium storing code for communication at a node is described. The code may include instructions executable by a processor to identify a device group, for collectively providing data provenance information for data generated at the device group, to a third party, provision a group profile, from the node, to the device group, receive, at the node, data from the device group, with individual portions of the data being generated at individual devices, and provision, to the device group, a set of evaluation parameters for generating collective data provenance information, the set of evaluation parameters being independent of the individual portions of the data.

In some examples of the method, apparatuses, and non-transitory computer-readable medium described herein, provisioning the group profile further may include operations, features, means, or instructions for provisioning, to the device group, at least one of a group identity, a device index, a member list, group credentials, or a function for evaluating the collective data provenance information of the data generated at the device group.

In some examples of the method, apparatuses, and non-transitory computer-readable medium described herein, provisioning the set of evaluation parameters further may include operations, features, means, or instructions for provisioning, to the device group, at least one of a message authentication code (MAC) share, a MAC key share, or a shared random parameter.

DETAILED DESCRIPTION

Generally, the described techniques provide for efficient, secure, multiparty computation based on using provisioned evaluation parameters to verify the provenance or authenticity of the individually produced data used to generate the collective data. When providing collective data generated by a device group, individual data privacy may be desired, and a number of issues may arise. In some examples, the devices may be mutually distrusting or may not have the ability to establish trust between one another. Additionally, introducing a privacy requirement of not disclosing the raw data generated at each of the devices, such that each device may not know the raw data contributed by each of the other devices, increases the complexity of authenticating raw data. Although trust or verification may be established between each of the devices, current methods may be computationally expensive and may not be scalable with the growing number of Internet of Things (IoT) devices.

Provisioning or transmitting evaluation parameters, from an owner to the individual devices, to verify authentication of individually generated data, may be beneficial for secure multiparty computations. In some examples, provenance or authentication may be guaranteed at the originating device or device producing the data. Fully homomorphic encryption may be employed for securely tying together different services without sharing sensitive data, but as with other authentication methods, it may be computationally expensive by introducing unwanted latency into processing time.

Figure 1:
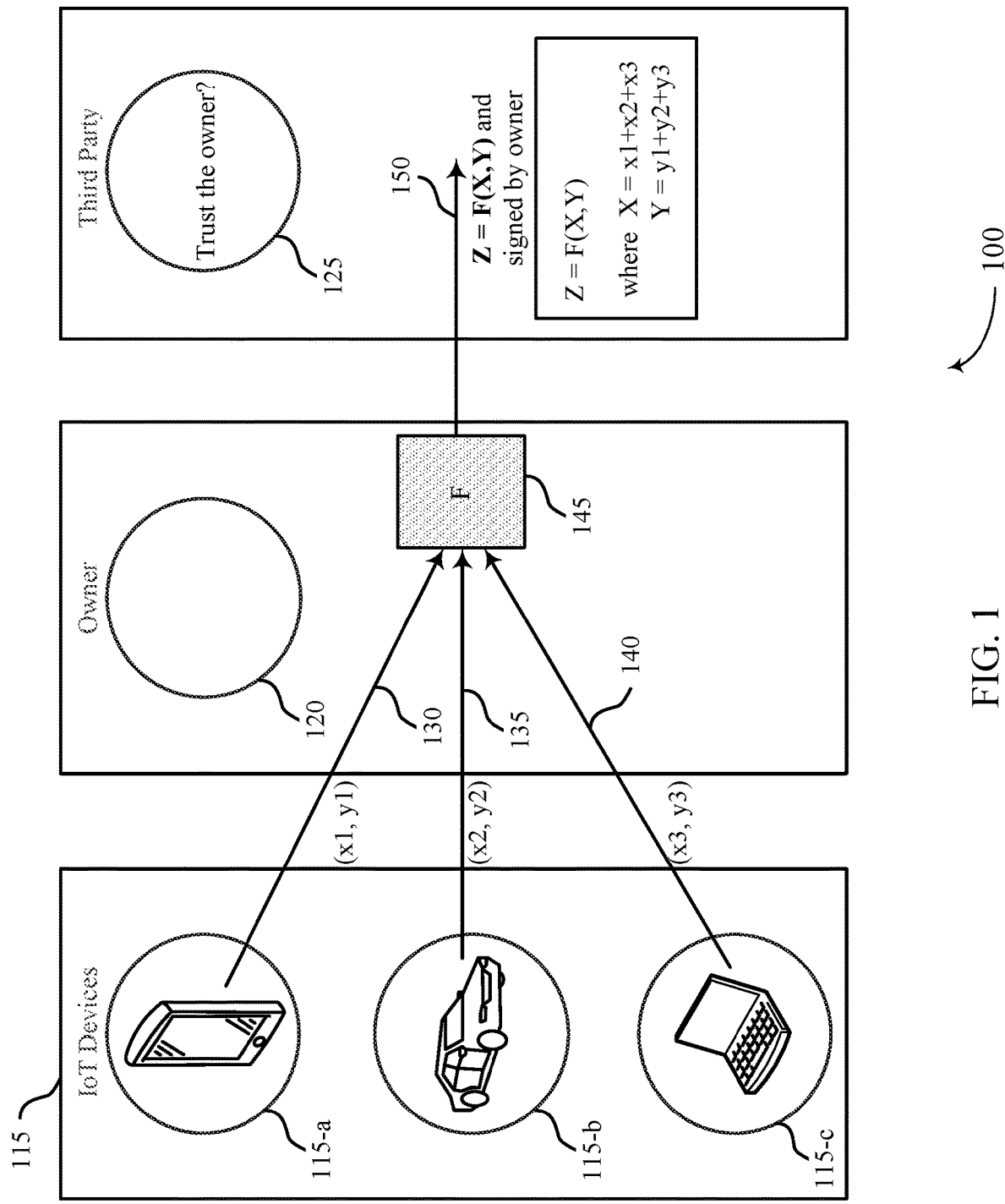
FIG. 1 illustrates an example of a system that supports aggregate data provenance in accordance with aspects of the present disclosure.

FIG. 1 illustrates an example of a communication system 100 that supports aggregate data provenance in accordance with aspects of the present disclosure. In some examples, communication system 100 may implement aspects of communication system 700. In the example of FIG. 1, the communication system 100 may include device 115-*a*, device 115-*b*, device 115-*c* of device group 115. In some examples, one or more of the devices of the device group may be an example of a user equipment (UE) 715 of FIG. 7, and may be any appropriate wired or wireless communications device.

In FIG. 1, device group 115 may be a group of Internet of Things devices that may produce data. The devices of device group 115 may be any Internet of Things devices, but for explanatory and discussion purposes and not of limitation, device 115-*a* may be a cell phone, device 115-*b* may be a car, and device 115-*c* may be a laptop computer. The devices may be any wired or wireless device that may produce data and that may be capable of communicating the produced data to a node, which in some examples, may be an owner of the data. The data produced by device group 115 may be provided to a third party 125, via node 120, as collective data, such as an average or relative value. Device 115-*a* may produce data $x_1$, $y_1$, device 115-*b* may produce data $x_2$, $y_2$, device 115-*c* may produce data $x_3$, $y_3$, and device 115-*n* (not illustrated in FIG. 1) may produce data $x_n$, $y_n$.

In the example of FIG. 1, device group 115 and corresponding data produced by device group 115 may belong to a node 120 and device group 115 may transmit the individually generated data to node 120. In some examples, device 115-*a* may transmit the individually generated data $x_1$, $y_1$ via communications link 130, device 115-*b* may transmit the individually generated data $x_2$, $y_2$ via communications link 135, and device 115-*c* may transmit the individually generated data $x_3$, $y_3$ via communications link 140, and so forth. The communications links 130, 135, and 140 may be wired or wireless communications links. The node 120 may perform function 145 on the received data from device group 115. Function 145 may be any appropriate mathematic function such as an arithmetic function, an algebraic function, and so forth. Function 145 may produce output value Z, which may be a function of X and Y, and such that Z=F(X,Y). In the example of FIG. 1, X may be the sum of each $x_n$ produced at each individual device, such that $X=x_1+x_2+x_3+\ldots x_n$ for n devices. Further, Y may be the sum of each $y_n$ produced at each individual device, such that $Y=y_1+y_2+y_3+\ldots y_n$ for n devices.

In FIG. 1, node 120 may sign the output value Z in an attempt to authenticate the data provided to third party 125. Even so, a number of trust issues may arise with multiple devices generating data that is provided as collective data to third party 125. Third party 125 may not trust node 120 and may not be able to authenticate the collective data provided by node 120. Further, third party 125 may not trust the individually generated data by each of the devices 115-*a*, 115-*b*, and 115-*c*. In some examples, the individually generated data may guarantee the provenance at the individual devices and throughout processing by other parties, which may be referred to as fully homomorphic encryption (FHE) herein. However, FHE may be computationally expensive and may introduce unwanted latency and processing overhead into the network. In some examples, the individual devices may process data cooperatively with one another and may sign the processed result or collective data, which may be referred to as secure multiparty computation (MPC) herein. By using secure MPC and signing the computation result or collective data, data provenance may be established, but secure MPC may also involve unwanted messaging overhead. In some examples, multiple rounds of public key crypto operations and message exchanges may be required to hide the individually owned data and the computational complexity may increase as the number of operations to evaluate the function increase, which may be an undesirable result. In some examples node 120 may be a party that owns the devices that produce or generate the data and the node 120 may be referred to interchangeably as the owner.

In some examples of secure MPC, a function may be performed at each of the devices. As discussed, the output value Z that is output by node 120 after performing function 145 may also be the sum of individual output value z's evaluated at each of the individual devices. In some examples, $Z=z_1+z_2+z_3+\ldots z_n$, for n devices. Z may additionally be set forth as, $Z=F(x_1, y_1)+F(x_2, y_2)+F(x_3, y_3)+\ldots F(x_n, y_n)$, which may be $F(x_1+x_2+x_3+\ldots x_n, y_1+y_2+y_3+\ldots y_n)$, thus yielding, F(X,Y). Thus, each device may locally evaluate $z_i=F(x_i, y_i)$ and all devices may open or share the result $z_i$ with each other or between each of the devices that generated individual data. Each device may authenticate or verify the $z_i$ of each of the other devices without knowing the individually generated data $x_i$, $y_i$ for each device. Continuing this example, all of the devices may agree on Z and sign the data. Although the function discussed is additive, the function may be any appropriate function that may be performed by the devices. In some examples, the devices may be devices that may communicate via a wired or wireless connection, and in some cases may be a wireless device such as a UE.

Figure 2:
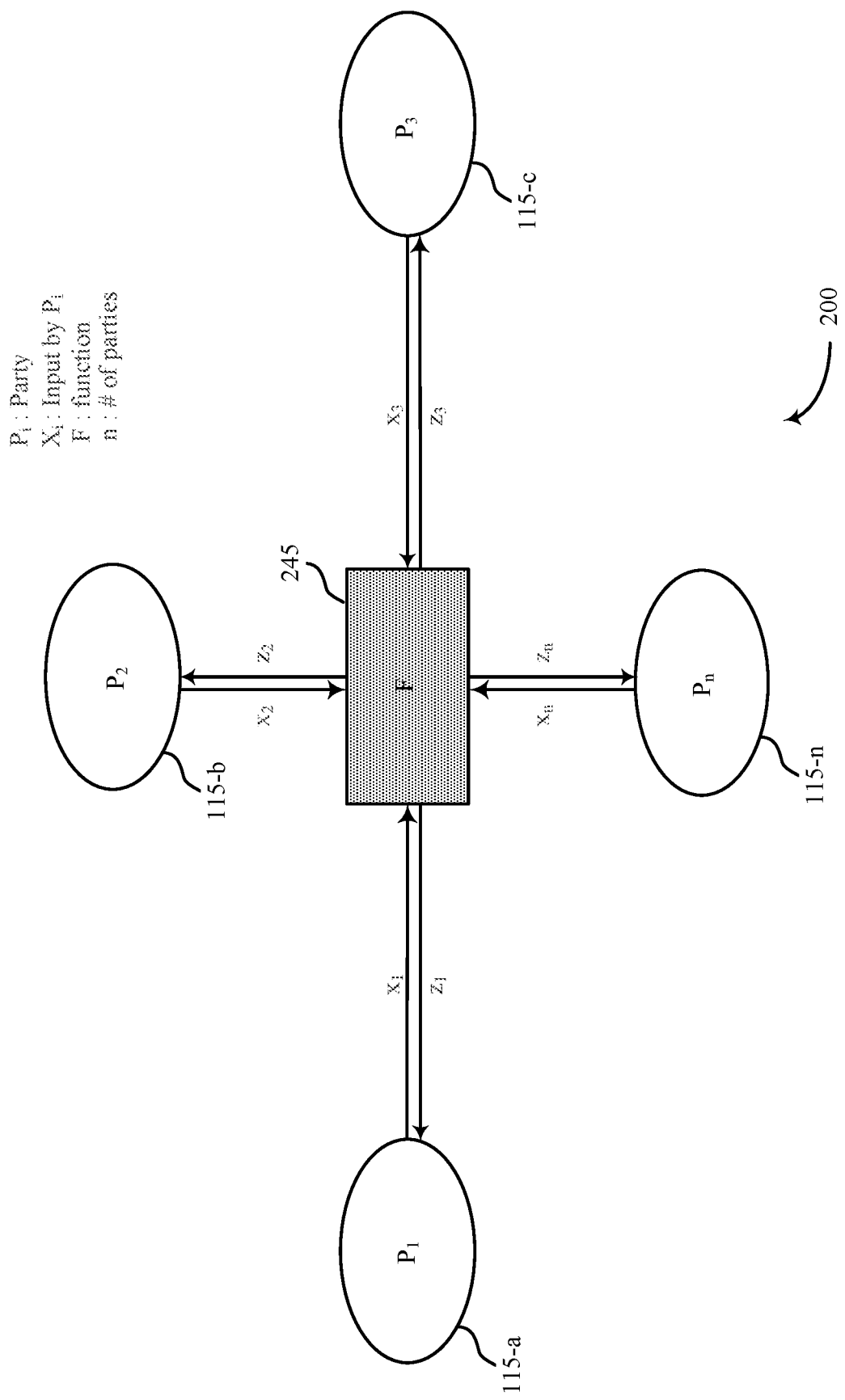
FIG. 2 illustrates an example of a system that supports aggregate data provenance in accordance with aspects of the present disclosure.

FIG. 2 illustrates an example of a communication system 200 that supports efficient aggregate data provenance in accordance with aspects of the present disclosure. In some examples, communication system 200 may implement aspects of communication system 100 and 700. In the example of FIG. 2, the communication system 200 may include party 1 ($P_1$) which may be an example of device 115-*a*, party 2 ($P_2$) which may be an example of device 115-*b*, party 3 ($P_3$) which may be an example of device 115-*c*, which may be any appropriate wired or wireless communications device and in some cases may be an example of UEs 715 as discussed in FIG. 7 herein.

Similar to FIG. 1, FIG. 2 is an example of MPC, in which each party, generically referred to as $P_i$, may provide private input data $x_i$ to function 245, in which data $x_i$ may be a generic reference to data $x_1$ which may be generated at $P_1$, data $x_2$ which may be generated at $P_2$, data $x_3$ which may be generated at $P_3$, and so forth. Data $x_i$ may be private input when individual data privacy is desired, as data $x_i$ may not be opened or shared with the other devices that generate data. Function 245 may evaluate the private input data $x_i$ to generate output $z_i$. Generally, F may be a function of $x_1$, $x_2$, $x_3$, ..., $x_n$) and may output $z_1$, $z_2$, $z_3$, ..., $z_n$, respectively. When evaluating function 245 in this manner, each party $P_i$ or a third party may receive output $z_i$ without any private input data being revealed between each of the parties that produce data.

Figure 3:
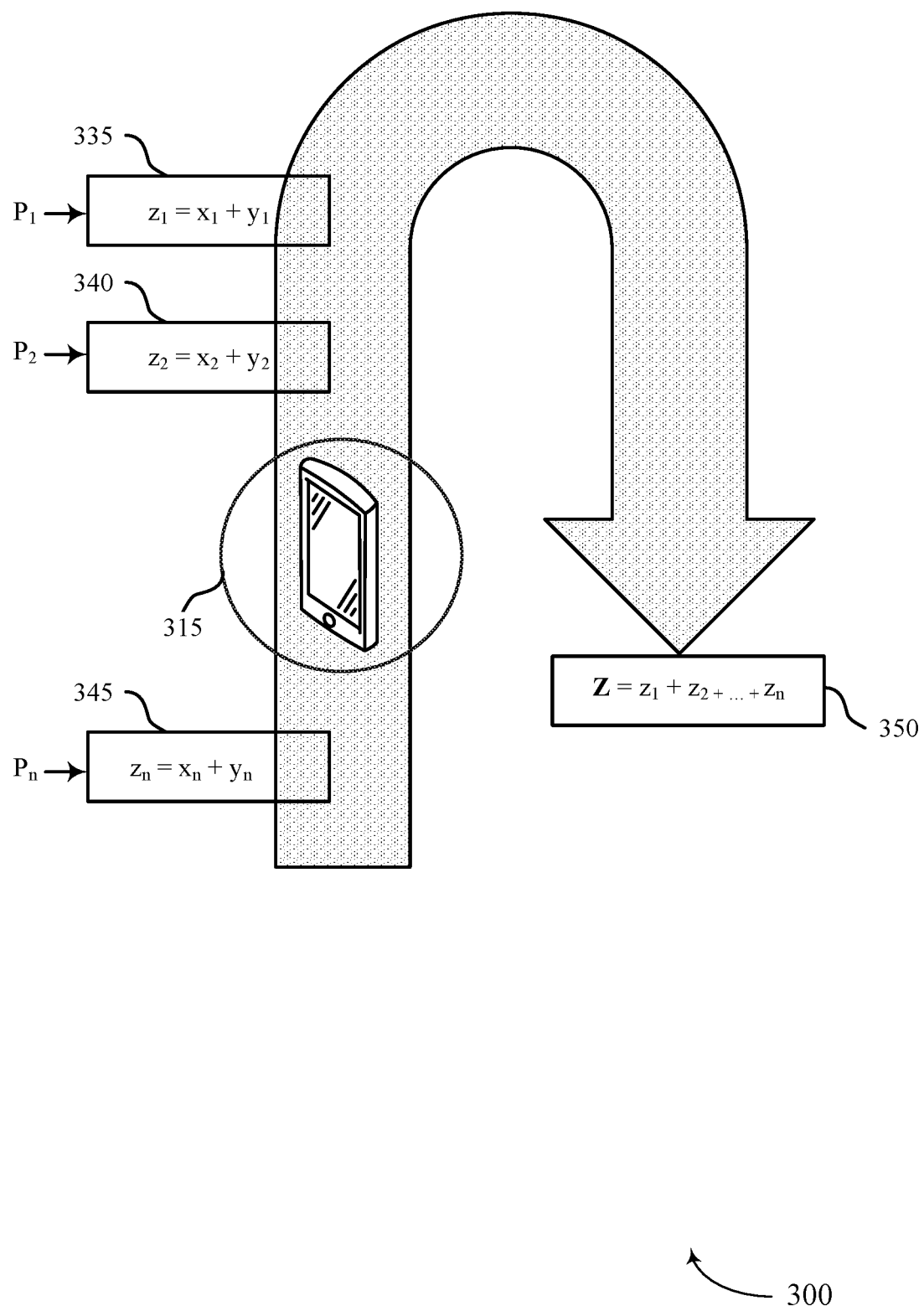
FIG. 3 illustrates an example of a system that supports aggregate data provenance in accordance with aspects of the present disclosure.

In some examples of FIG. 2, data privacy may be maintained without the data generating parties having to share or reveal data to another device and/or to the third party that may be requesting the collective data. In FIG. 2, evaluating function 245 may be sufficient in the example that a trusted party evaluates function 245. However, in the example that a trusted party may not be assumed, the role of the trusted party may be replaced by a protocol between the parties that generate data, own the data, and request the data, which will be discussed in further detail herein FIG. 3 illustrates an example of a communication system 300 that supports efficient aggregate data provenance in accordance with aspects of the present disclosure. In some examples, communication system 300 may implement aspects of communication system 100, 200, and 700. In the example of FIG. 3, the communication system 300 may include party 1 ($P_1$) which may be an example of device 115-a, party 2 ($P_2$) which may be an example of device 115-b, party 3 ($P_3$) which may be an example of device 115-c, which may be an example of devices 715 as discussed in FIG. 1, FIG. 2, and FIG. 7.

Similar to FIG. 2, FIG. 3 is an example of secure MPC, in which each of the parties or devices 315 may generate individual data or individual portions of data. In some examples, party 1 or $P_1$ may generate individual data $x_1$ and $y_1$, party 2 or $P_2$ may generate individual data $x_2$ and $y_2$, party n or Pn may generate individual data $x_n$ and $y_n$, and so forth. In FIG. 3, party 1 may generate the individual data $x_1$ and $y_1$ and may calculate $z_1$ using the function 335. Similarly, party 2 may generate the individual data $x_2$ and $y_2$ and may calculate $z_2$ using the function 340, and party n may generate the individual data $x_n$ and $y_n$ and may calculate $z_n$ using the function 345. Although the functions 335, 340, and 345 are additive, it is for explanatory purposes only and not of limitation. Functions 335, 340, and 345 may be additive, algebraic, or any other appropriate function or combination of functions. Each of the individual parties may evaluate or calculate the individual $z_n$ values and the individual parties may not share the individually generated data with other parties that also generated data. The individual parties of FIG. 3 may also be referred to herein as devices. The individual parties and/or devices may both generate and/or produce data.

In some examples, the individually calculated $z_n$ values may be provided to the node for further data evaluation. In FIG. 3, the parties may provide the individual $z_1, z_2, \ldots, z_n$ values to the node. The node may calculate Z using the function 350 and also using the individual $z_n$ values. In some examples, the function 350 for calculating Z may equal the sum of the individual $z_n$ values, $Z = z_1 + z_2 + \ldots + z_n$.

Figure 4:
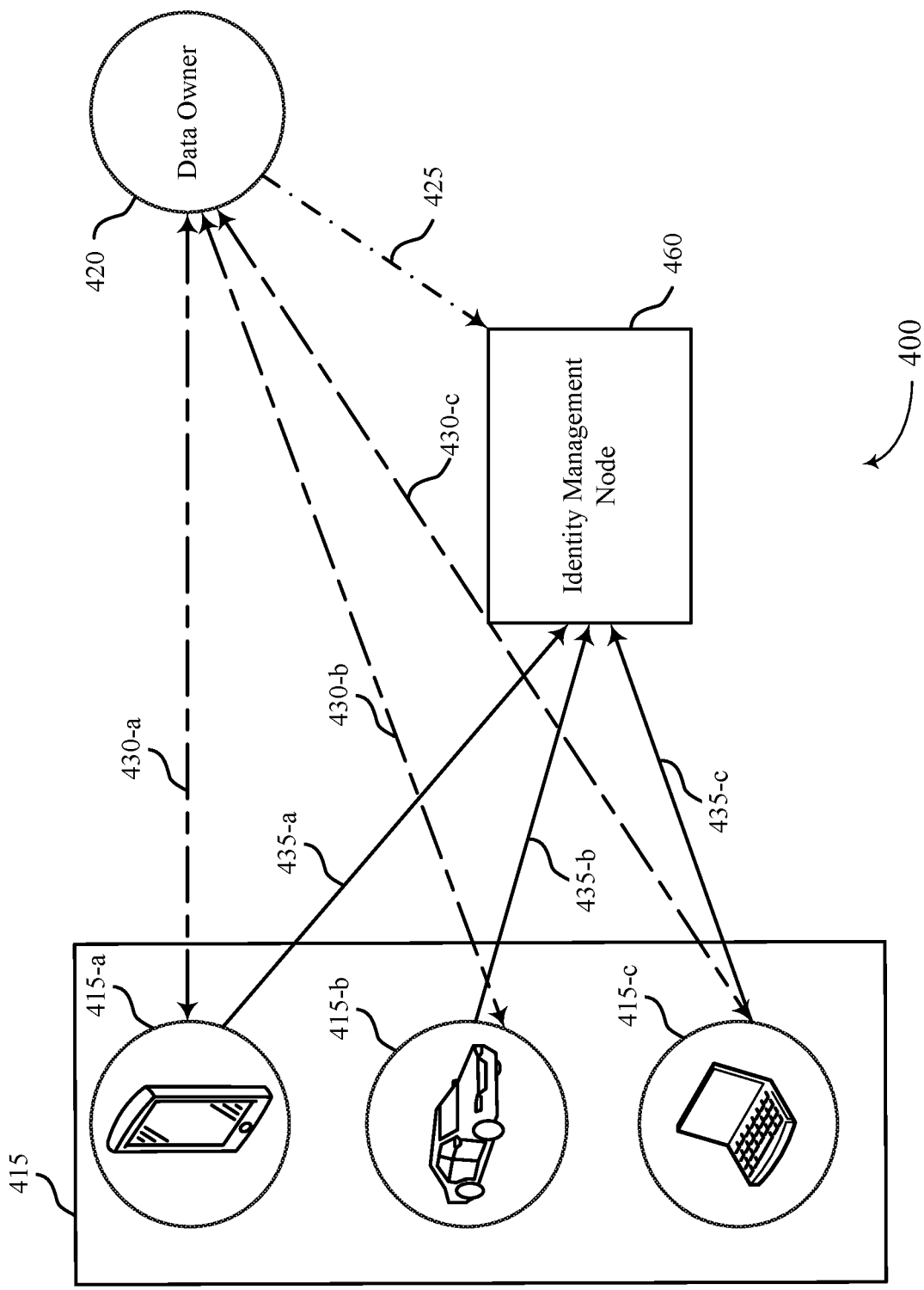
FIG. 4 illustrates an example of a system that supports aggregate data provenance in accordance with aspects of the present disclosure.

FIG. 4 illustrates an example of a communication system 400 that supports efficient aggregate data provenance in accordance with aspects of the present disclosure. In some examples, communication system 400 may implement aspects of communication system 100, 200, 300, and 700, which in some examples may be a wireless communication system. In the example of FIG. 4, the communication system 400 may include device 415-a, device 415-b, device 415-c of device group 415, which may be an example of devices 115 as discussed in FIG. 1 and FIG. 2, or devices 315 of FIG. 3. The devices as described herein may be wired or wireless devices, and in some cases the wireless devices may be a UE 715 as described in FIG. 7.

As previously discussed, devices of a device group may produce data, where the individual data when aggregated, the data may provide value. In some examples, the device which generates the data may be trusted and the devices may trust one another, and individual data privacy may not be necessary. In this example, if one of these devices that generates data is compromised, then the aggregate data is also compromised, and it may be desirable to avoid this type of single point failure. Further to this example and based on the mutual trust assumption, it may be possible to verify the data contributed by the individual devices through some type of authentication, without knowing the role of the devices.

Alternatively and in some cases, the owner of the individual data may not want to disclose the individually produced data to any external parties that may wish to use the data, but may provide the aggregate data while still protecting the individual data privacy. Further considerations may be present, in that each device that may produce and/or generate data may also be mutually distrusting of one another. Data provenance may be desirable due to the quality of data requests of the third party using the data. In some examples, a processing function, F(X,Y) may be applied to data collected over all the devices, where X may include the individual data $x_i$ produced by each device and Y may include the individual data $y_i$ produced by each device.

A third-party (such as a third party buyer) may request the aggregate data and may additionally request authenticated aggregate data. The aggregate data may be referred to herein as Z, where Z does not include the values of the individual data such as $x_i$, $y_i$. The owner or the node may collectively sign the data Z. However an issue may arise when the data is provided by the individual devices, but the signature is generated by the node. Without a solution, the chain of provenance of the data may be lost. Therefore, it may be desirable to improve on providing data provenance while protecting the individual data privacy.

In FIG. 4, an ownership structure may be created between the node 420 and the device group 415 which may provide for a more efficient, secure MPC, by reducing processing intensive computations and which may additionally allow the devices to protect and/or not disclose individually owned raw data generated at each device. In FIG. 4, the node 420 may be a device owner and/or a data owner. As illustrated in FIG. 4, the ownership structure may be created between the node 420, the device group 415 and the identity management node 460. Generally, the node 420 may be a device owner and in some cases may be a data owner of the data generated by the device group 415. The identify management node 460 may store credentials, store ownership structures and may provide verification services when appropriate.

As illustrated in FIG. 4, user registration may occur via communications link 425, from the node 420 and to the identity management node 460 by registering the node 420 as a user with the identity management node 460. During the device personalization process, the node 420 may create device personalization via communications links 430-a, 430-b, and 430-c, for respective devices 415-a, 415-b, and 415-c. In some cases, the communications links 430-a, 430-b, and 430-c may be unidirectional communications from the node 420 to the device group 415, unidirectional communications from the device group 415 to the node 420, or bidirectional communications between the node 420 and the device group 415.

In FIG. 4, device 415-a, may share, transmit, or communicate, via communications link 430-a, the device identification and device credentials of device 415-a to the node 420. Device 415-b, may share, transmit, or communicate, via communications link 430-b, the device identification and device credentials of device 415-b to the node 420, and similarly device 415-c, may share, transmit, or communicate, via communications link 430-c, the device identification and device credentials of device 415-c to the node 420. Node 420 may provision or share the owner profile or information with devices 415-a, 415-b, and 415-c via respective communications links 430-a, 430-b, and 430-c.

Additionally during the device personalization process, the node 420 may provision a group profile, via the communications links 430 to the device group 415. The group profile may include various information including, but not limited to, a group identification, device index, member list, credential(s), functions to evaluate at each of the individual devices, and so forth and any combination thereof. The group profile may identify other devices to be included in collective data provenance generation with the existing devices and may additionally provide a function for generating device-specific portions of the collective data provenance information. After each device locally receives the function via the group profile, devices 415-a, 415-b, 415-c may each locally evaluate the received function. Further, each device may perform the same evaluation of the function until the evaluation of the function is complete, to produce a local evaluation result at each of the devices.

In the group profile, the group identity may identify the group, and may identify that the device or devices may provide collective data provenance information for data generated at the device or devices. The device index may identify a specific device where a device identification may also be used. A member list may include group member indices or identifiers and the credentials may be group member credentials (e.g., public keys). In some examples, the communications links 430 may be a secure channel which may be created based on the device personalization. Further, group registration may be additionally illustrated in FIG. 4 via communications links 435-a, 435-b, and 435-c. Devices 415-a, 415-b, and 415-c may register as a group via respective communications links 435-a, 435-b, and 435-c.

Figure 5:
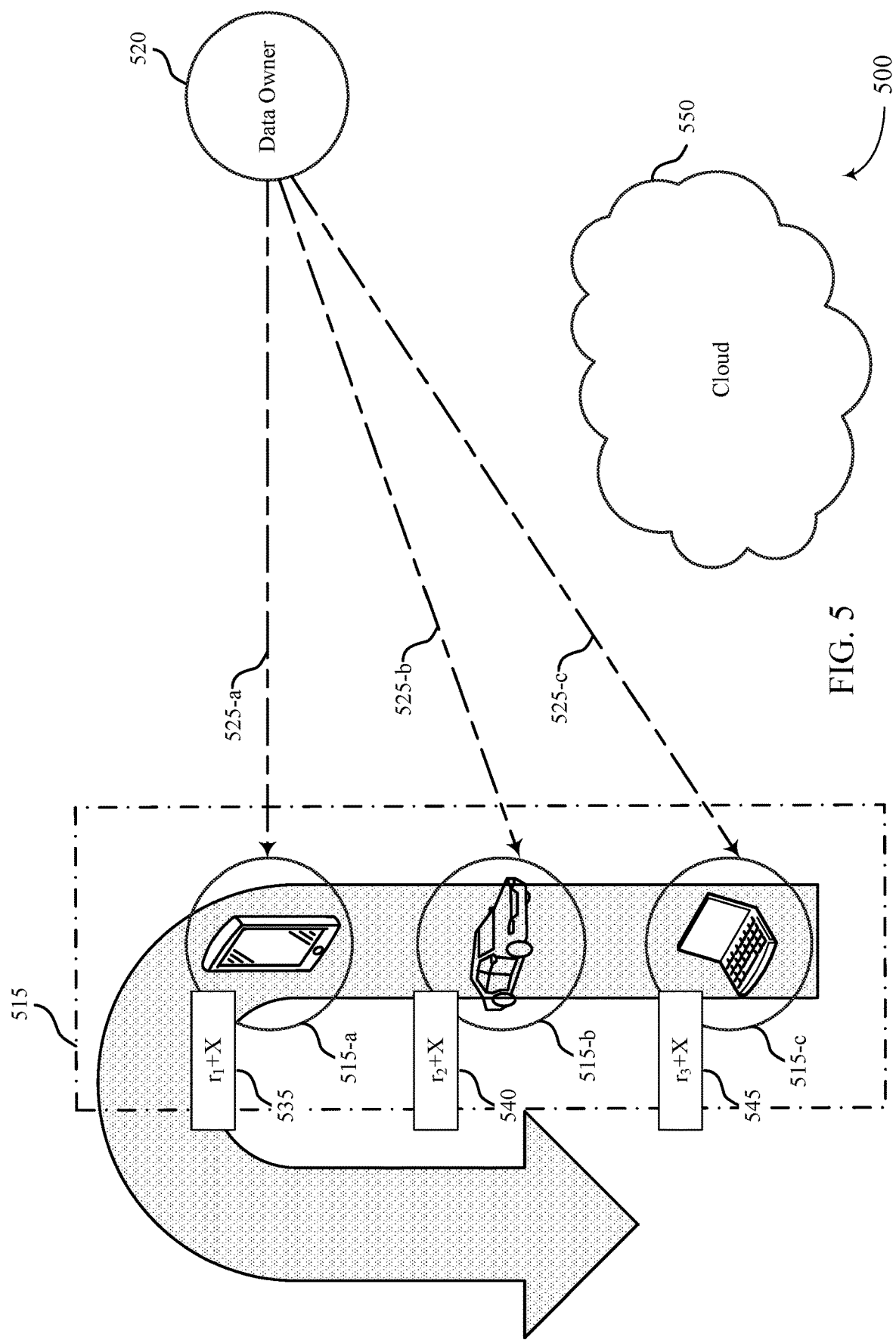
FIG. 5 illustrates an example of a system that supports aggregate data provenance in accordance with aspects of the present disclosure.

FIG. 5 illustrates an example of a system 500 that supports efficient aggregate data provenance in accordance with aspects of the present disclosure. In some examples, communication system 500 may implement aspects of communication system 100, 200, 300, 400, and 700, which in some examples may be a wireless communication system. In the example of FIG. 5, the communication system 500 may include device 515-a, device 515-b, device 515-c of device group 515, which may be an example of devices 115, 315, or 415, as discussed in FIG. 1, FIG. 2, FIG. 3, and FIG. 4. The devices as described herein may be wired or wireless devices, and in some cases the wireless devices may be a UE 715 as described in FIG. 7.

In FIG. 5, each of the devices 515-a, 515-b, 515-c may produce or generate data. In some examples, device 515-a may individually produce or generate individual data ($x_1$, $y_1$), device 515-b, may individually produce or generate individual data ($x_2$, $y_2$), and device 515-c may individually produce or generate individual data ($x_3$, $y_3$). In some examples, the data produced by device 515-a may be referred to as a first portion of the data and the data produced by the other devices 515-b, 515-c, . . . , 515-n may be referred to as the additional portions of the data. To perform secure MPC, the devices may not share the individually produced data between each of the devices, and also may not share the individual generated data with the node 520. In some examples, the node 520 may be a device owner and/or a data owner.

The node 520 may generate evaluation parameters such as a shared random parameter, a message authentication code (MAC) key and a MAC on the shared random parameter. The shared random parameter may be represented by $r_i$, the MAC key, may be referred to as the individual verification key and may be represented by $alpha_i$ or $\alpha_i$, and the MAC on $r_i$, which may be represented by $\gamma(r_i)$. The node 520 may generate each of these evaluation parameters for each of the devices that generate data. In some examples, the node 520 may provision or share the corresponding shared random parameter, the MAC key, and the MAC on the shared random parameter to each respective device. Further, in FIG. 5, the node 520 may provision $r_i$, $\alpha_i$, and $\gamma(r_i)$ to device 515-a, $r_2$, $\alpha_2$, and $\gamma(r_2)$ to device 515-b, and $r_3$, $\alpha_3$, and $\gamma(r_3)$ to device 515-c, and so forth. In some examples, the node 520 may be a device owner and/or a data owner. As illustrated in FIG. 5, the node 520 may provision the evaluation parameters to the device 515-a via the communications link 525-a. Additionally, the node 520 may provision the evaluation parameters to the device 515-b via the communications link 525-b, and similarly the node 520 may provision the evaluation parameters to the device 515-c via the communications link 525-c.

In FIG. 5, device 515-a may locally generate or produce individual data $x_1$. Device 515-a may locally evaluate the function $r_1+x_1$, and may share the locally evaluated function, the MAC key $\alpha_1$, and the MAC on the shared random parameter $\gamma(r_1)$ with each of the other devices 515-b and 515-c. Similarly, device 515-b may locally evaluate the function $r_2+x_2$, and may share the locally evaluated function, the MAC key $\alpha_2$, and the MAC on the shared random parameter $\gamma(r_2)$ and so forth. After all the locally evaluated functions, MAC keys, and MACs on the shared random parameter have been shared between each of the devices, each device may then calculate the respective shared random parameter, $r_i$, for each of the other devices and for each of the corresponding received functions using $\gamma(r_i)=\alpha_1*r_1$. Each of the devices may then calculate $x_i$ for each of the other devices, and then may calculate X as the sum of the each calculated $x_i$ for each device. Even though each of the devices may calculate X from the shared values received from each of the other devices, the value X has not been verified yet.

As previously discussed in FIG. 4, a function 535 may be locally evaluated at device 515-a. In FIG. 5, function 535 may be an additive function and may be the sum of the provisioned shared random parameter, $r_1$, and the previously calculated value X, or $r_1+X$. Each device may locally receive the function 535 via the group profile, and may additionally locally receive the shared random parameter and MAC on the shared random parameter via the provisioned evaluation parameters. The device 515-a may share the locally evaluated function $r_1+X$, the MAC key $\alpha_1$, and the MAC on the shared random parameter, $\gamma(r_1)$, with each of the other devices such as device 515-b and device 515-c. After the locally evaluated function, MAC key, and MAC on the shared random parameter have been shared with each of the devices, each device may then calculate the device 515-a shared random parameter, $r_1$, using $\gamma(r_1)=\alpha_1*r_1$.

In FIG. 5, the devices may not share the locally generated data with the node 520 and also may not share the locally generated data with the other devices. Even so, the devices may locally calculate the MAC share $\gamma(X)$. Because device 515-a may have the shared MAC key $\alpha_2$, device 515-a may use as to calculate the MAC share $\gamma(X)$ using $\alpha_2*X=\gamma(X)$. Although each of the previous calculations in FIG. 5 have been discussed as being performed at a single device, all of the calculations may be performed at each data generating device. For example, each device may calculate the shared random parameter for each of the received locally evaluated functions. Further, each device may calculate X.

Next, the devices may proceed with verification of the calculated X. As discussed herein, even though each of the devices may calculate X from the received locally evaluated function, the value X may need verification. For verification, device 515-b may locally evaluate the function $r_2+X$, and may share the locally evaluated function, the MAC key $\alpha_2$, and the MAC on the shared random parameter $\gamma(r_2)$ and so forth with each of the other devices. After the locally evaluated function, MAC key, and MAC on the shared random parameter for device 515-b have been shared with each of the devices, each device may then use the shared random parameter $r_2$, the MAC on the shared random parameter $\gamma(r_2)$, and the MAC key $\alpha_2$ to calculate $\gamma(X)$. Device 515-b may then share locally evaluated function $r_2+X$, MAC on X $\gamma(X)$, and MAC on the shared random parameter $\gamma(r_2)$ for device 515-*b*. Device 515-*b* may also share the MAC key $\alpha_2$ with each of the other devices. Then, device 515-*b* may verify $r_2+X$ using $\gamma(r_2)=\alpha_2*r_2$ and $\gamma(X)=\alpha_2*X$. Once this verification is successful, the sharing of X is verified as $\gamma(X)$ is correct or $X=(r_2+X)-r_2$.

In some examples, the devices 515-*a*, 515-*b*, and 515-*c* may sign the data to guarantee and/or authenticate the provenance of the data. Although the data may be signed by each individual device and reported to the cloud 550 and/or data storage separately, this may involve high latency messaging and verification overhead which may be computationally expensive. Alternatively in some examples, the device group 515 may collectively sign the data which may employ a multi-signature and/or threshold-signature scheme which may be more efficient than individual signatures. In some examples, the data may be signed using the collective data provenance information. After evaluation of the function completes and the devices collectively agree on an output, the devices may collectively create a signature and collectively sign the data. The devices may then report the results to the cloud 550 and/or to a server.

In some examples, device 515-*a* of device group 515 may be triggered to evaluate the function 535 with other devices of the device group 515. The device 515-*a* may identify that the device 515-*a* may provide collective data provenance information. Further, the device may be signaled by the node 520, by receiving an indication from the node 520 to provide the collective data provenance information. In some examples, the trigger to evaluate the function 535 with other devices of the device group 515 may be an event and/or may be timed. For example, device 515-*a* may identify that the device 515-*a* may provide collective data provenance information and the device 515-*a* may identify that a predetermined event has occurred, where the predetermined event may trigger the collective data provenance generation.

Figure 6:
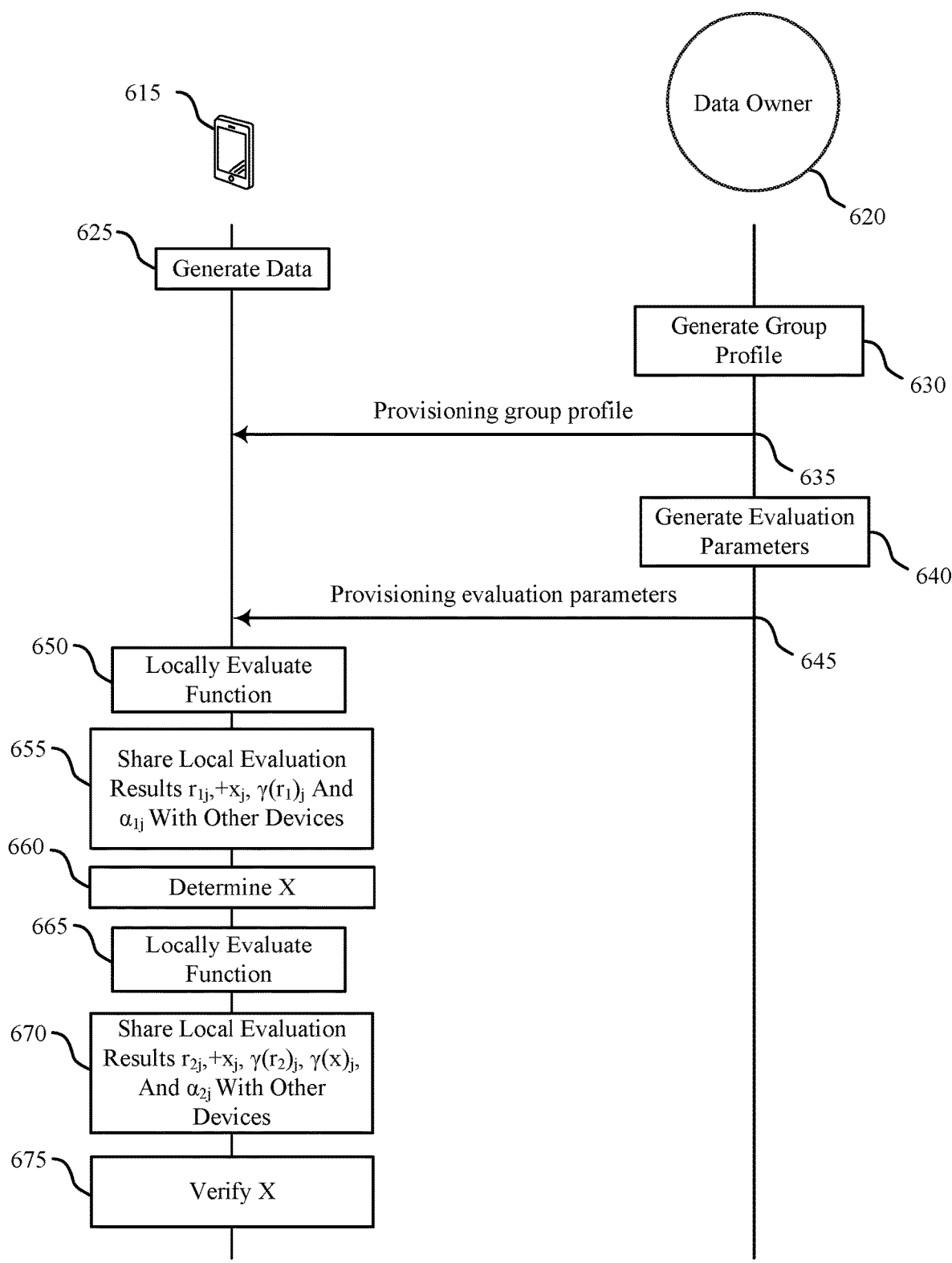
FIG. 6 illustrates an example of a process flow that supports aggregate data provenance in accordance with aspects of the present disclosure.

FIG. 6 illustrates an example of a process flow 600 that supports efficient aggregate data provenance in accordance with aspects of the present disclosure. In some examples, process flow 600 may implement aspects of communications system 100, 200, 300, 400, 500, and 700, which in some examples may be a wireless communication system. In the example of FIG. 6, process flow 600 may include device group 615, which may be an example of devices 115, devices 315, devices 415, or devices 515 as discussed in FIG. 1, FIG. 3, FIG. 4, and FIG. 5. The devices as described herein may be wired or wireless devices, and in some cases the wireless devices may be a UE 715 as described in FIG. 7. The process flow 600 may depict the series of generating data, computations, and transmissions passing between the data generating device group 615 and the node 620.

In FIG. 6, the device group 615 may generate data at 625. The device group 615 may include individual devices that locally generate individual data. In some examples, the devices of the device group 615 may not share the individually generated data between the devices. At 630, the node 620 may generate the group profile. The group profile may include various information including, but not limited to, a group identification, device index, member list, credential(s), functions to evaluate at each of the individual devices, and so forth and any combination thereof. The group profile may identify other devices to be included in collective data provenance generation with the existing devices and may additionally provide a function for generating device-specific portions of the collective data provenance information. Additionally, in the group profile, the group identity may identify the group, and may identify that the device or devices may provide collective data provenance information for data generated at the device or devices. The device index may identify a specific device where a device identification may also be used. A member list may include group member indices or identifiers and the credentials may be group member credentials (e.g., public keys). At 635, the node 620 may provision the group profile to each of the individual devices of the device group 615. In some examples, the node 620 may be a device owner and/or a data owner.

At 640, the node 620 may generate the evaluation parameters such as a random parameter, a message authentication code (MAC) key and a MAC on the random parameter. The random parameter may be represented by $r_i$, the MAC key may be referred to as the individual verification key and may be represented by alpha$_i$ or $\alpha_i$, and the MAC on $r_i$ may be represented by $\gamma(r_i)$. In FIG. 6, the device 615 may not share the individually generated data with the node 620 and also may not share the individually generated data with the other devices within the device group.

At 645, the node 620 may then provision a shared random parameter $r_{ij}$, the MAC key shares $\alpha_{ij}$, and the MAC shares $\gamma(r_i)_j$ to each of the individual devices, where j is the device index. A shared parameter provisioned by node 620 to an individual device (such as device 615) may also be notated using brackets, as in $[r_i]$, $[\alpha_i]$, and $[\gamma(r_i)]$.

At 650 and 655, each of the individual devices (such as device 615) may locally evaluate the function, $r_i+X$. This may be done by each device evaluating $r_{ij}+x_j$, (at 650) and then sharing the results (at 655) so that each device may determine $r_i+X$. For example, if device 615 had device index j=1, then device 615 would evaluate $r_{i1}+x_1$ at 650. Device 615 would then share this result (at 655) with other individual devices, which would in turn share their own locally evaluated results with device 615. Device 615 would then use the shared results to determine $r_i+X$.

In some examples, the values $r_{ij}$, and $\gamma(r_i)_j$ may be first shared or broadcasted within the group and between each of the devices, and then the value $\alpha_{ij}$ may be shared or broadcasted within the group and between each of the devices. By sharing or broadcasting the values $\alpha_{ij}$, $r_{ij}$, and $\gamma(r_i)_j$ within the group and between each of the devices, each device can reconstruct $\alpha_i$, $r_i$, and $\gamma(r_i)$, thus verifying the computed value is correct. Because each device may know the shared parameters of the other individual devices for i=1, for example, (in other words, MAC on $r_{1j}$, $\gamma(r_1)_j$, and the MAC key share $\alpha_{1j}$, each of the devices may compute $r_1$ using $\gamma(r_1)=\alpha_1*r_1$. Then (at 660) each device of the device group may calculate $X=(r_1+X)-r_1$. Note, however, that even though the devices may calculate X, X has not been verified yet.

In order to verify X, an additional round of sharing is used. This time, different values of the MAC on $r_i$, $\gamma(r_i)$, the MAC key $\alpha_i$ and random parameter $r_i$ are used. Similar to the previous round of sharing and in some examples, the values $r_{2j}$, and $\gamma(r_2)_j$ may be first shared or broadcasted within the group and between each of the devices in this round, and then the value $\alpha_{2j}$ may be shared or broadcasted within the group and between each of the devices. For example, if the MAC on $r_1$, $\gamma(r_1)$, MAC key $\alpha_1$ and random parameter $r_1$ had been used in steps 650 and 655, now the MAC on $r_2$, $\gamma(r_2)$, MAC key $\alpha_2$ and random parameter $r_2$ may be used. The MAC on $r_2$, $\gamma(r_2)_j$, MAC key share $\alpha_{2j}$ and random parameter share $r_{2j}$ may have been received at step 645, along with the other evaluation parameters.

At 665, device 615 (and the other individual devices) may compute a MAC share of X. This may be completed by each device evaluating $\alpha_{ij}*X=\gamma(X)_i$, where i=2 in the example described above.

At 670, the individual devices (including device 615) may share the results of their evaluation (from 665), as well as shares of other evaluation parameters. For example, each device may share its values of $r_{2j}+x_j$, $\alpha_{2j}$, $\gamma(r_2)_j$, and $\gamma(X)_j$. By sharing or broadcasting the values $r_{2j}+x_j$, $\alpha_{2j}$, $\gamma(r_2)_j$, and $\gamma(X)_j$ within the group and between each of the devices, each device can reconstruct or otherwise compute $r_2$, $\alpha_2$, $\gamma(r_2)$, and $\gamma(X)$.

Using the determined parameters, device 615 (and the other individual devices) may verify X (at 675). For example, device 615 may verify $r_2+x$ by using $\gamma(r_2)=\alpha_2*r_2$ and $\gamma(X)=\alpha_2*X$. Once this verification is successful, the sharing of X is verified as $\gamma(X)$ is correct or $X=(r_2+X)-r_2$.

Figure 7:
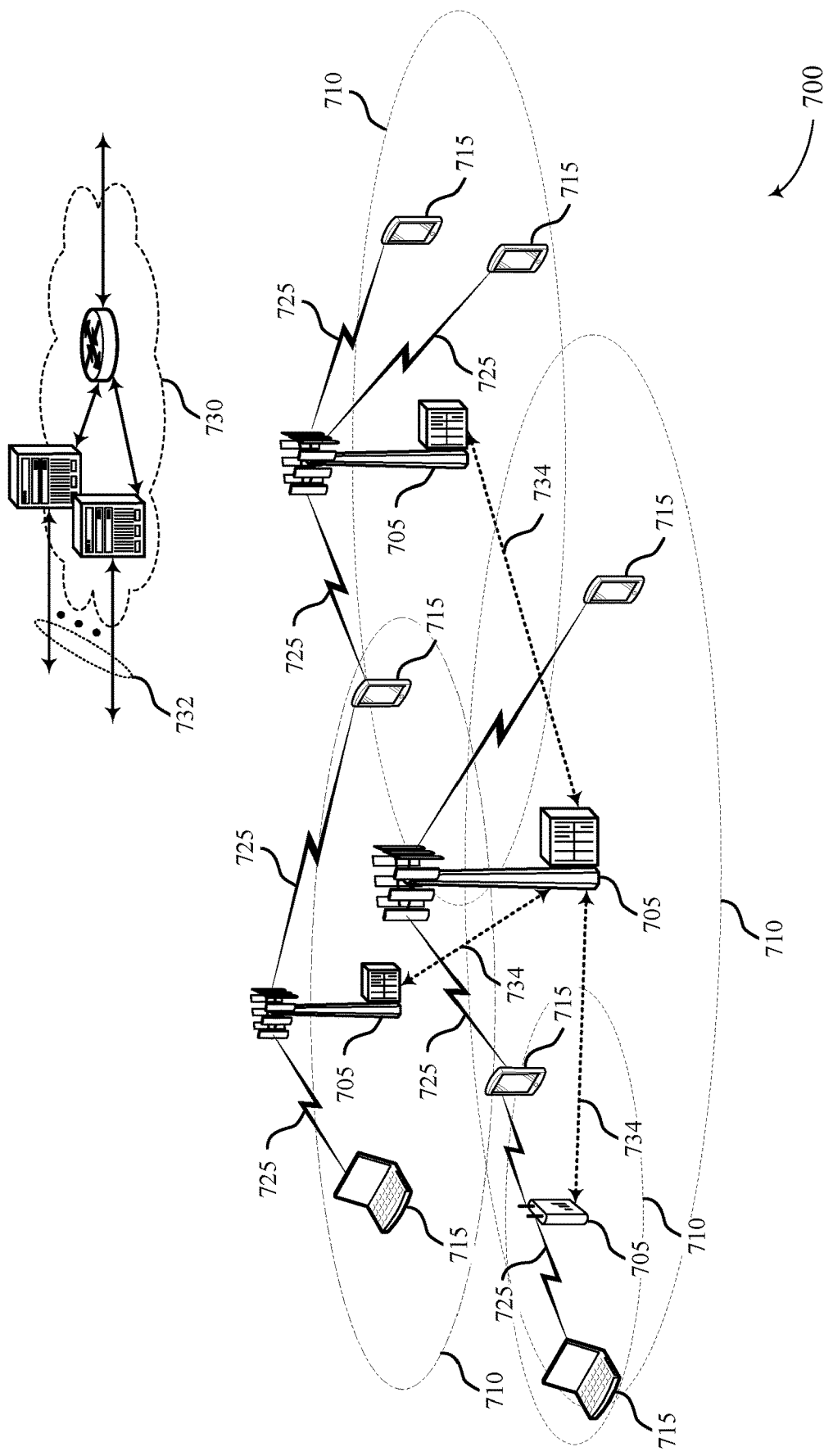
FIG. 7 illustrates an example of a system for wireless communications that supports aggregate data provenance in accordance with aspects of the present disclosure.

FIG. 7 illustrates an example of a wireless communications system 700 that supports efficient aggregate data provenance in accordance with aspects of the present disclosure. The wireless communications system 700 includes base stations 705, UEs 715, and a core network 730. In some examples, the wireless communications system 700 may be a Long Term Evolution (LTE) network, an LTE-Advanced (LTE-A) network, an LTE-A Pro network, or a New Radio (NR) network. In some cases, wireless communications system 700 may support enhanced broadband communications, ultra-reliable (e.g., mission critical) communications, low latency communications, or communications with low-cost and low-complexity devices. In some examples, the UEs 715 may be examples of the devices 115 described with reference to FIG. 1 and FIG. 2, or devices 315, 415, 515, or 715 as described with reference to FIGS. 3, 4, 5, and 6, respectively.

Base stations 705 may wirelessly communicate with UEs 715 via one or more base station antennas. Base stations 705 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 700 may include base stations 705 of different types (e.g., macro or small cell base stations). The UEs 715 described herein may be able to communicate with various types of base stations 705 and network equipment including macro eNBs, small cell eNBs, gNBs, relay base stations, and the like.

Each base station 705 may be associated with a particular geographic coverage area 710 in which communications with various UEs 715 is supported. Each base station 705 may provide communication coverage for a respective geographic coverage area 710 via communication links 725, and communication links 725 between a base station 705 and a UE 715 may utilize one or more carriers. Communication links 725 shown in wireless communications system 700 may include uplink transmissions from a UE 715 to a base station 705, or downlink transmissions from a base station 705 to a UE 715. Downlink transmissions may also be called forward link transmissions while uplink transmissions may also be called reverse link transmissions.

The geographic coverage area 710 for a base station 705 may be divided into sectors making up a portion of the geographic coverage area 710, and each sector may be associated with a cell. For example, each base station 705 may provide communication coverage for a macro cell, a small cell, a hot spot, or other types of cells, or various combinations thereof. In some examples, a base station 705 may be movable and therefore provide communication coverage for a moving geographic coverage area 710. In some examples, different geographic coverage areas 710 associated with different technologies may overlap, and overlapping geographic coverage areas 710 associated with different technologies may be supported by the same base station 705 or by different base stations 705. The wireless communications system 700 may include, for example, a heterogeneous LTE/LTE-A/LTE-A Pro or NR network in which different types of base stations 705 provide coverage for various geographic coverage areas 710.

The term "cell" refers to a logical communication entity used for communication with a base station 705 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 710 (e.g., a sector) over which the logical entity operates.

UEs 715 may be dispersed throughout the wireless communications system 700, and each UE 715 may be stationary or mobile. A UE 715 may also be referred to as a mobile device, a wireless device, a remote device, a handheld device, or a subscriber device, or some other suitable terminology, where the "device" may also be referred to as a unit, a station, a terminal, or a client. A UE 715 may also be a personal electronic device such as a cellular phone, a personal digital assistant (PDA), a tablet computer, a laptop computer, or a personal computer. In some examples, a UE 715 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 715, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 705 without human intervention. In some examples, M2M communication or MTC may include communications from devices that integrate sensors or meters to measure or capture information and relay that information to a central server or application program that can make use of the information or present the information to humans interacting with the program or application. Some UEs 715 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 715 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 715 include entering a power saving "deep sleep" mode when not engaging in active communications, or operating over a limited bandwidth (e.g., according to narrowband communications). In some cases, UEs 715 may be designed to support critical functions (e.g., mission critical functions), and a wireless communications system 700 may be configured to provide ultra-reliable communications for these functions.

In some cases, a UE 715 may also be able to communicate directly with other UEs 715 (e.g., using a peer-to-peer (P2P) or device-to-device (D2D) protocol). One or more of a group of UEs 715 utilizing D2D communications may be within the geographic coverage area 710 of a base station 705. Other UEs 715 in such a group may be outside the geographic coverage area 710 of a base station 705, or be otherwise unable to receive transmissions from a base station 705. In some cases, groups of UEs 715 communicating via D2D communications may utilize a one-to-many (1:M) system in which each UE 715 transmits to every other UE 715 in the group. In some cases, a base station 705 facilitates the scheduling of resources for D2D communications. In other cases, D2D communications are carried out between UEs 715 without the involvement of a base station 705.

Base stations 705 may communicate with the core network 730 and with one another. For example, base stations 705 may interface with the core network 730 through backhaul links 732 (e.g., via an S1, N2, N3, or other interface). Base stations 705 may communicate with one another over backhaul links 734 (e.g., via an X2, Xn, or other interface) either directly (e.g., directly between base stations 705) or indirectly (e.g., via core network 730).

The core network 730 may provide user authentication, access authorization, tracking, Internet Protocol (IP) connectivity, and other access, routing, or mobility functions. The core network 730 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 715 served by base stations 705 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 705, may include subcomponents such as an access network entity, which may be an example of an access node controller (ANC). Each access network entity may communicate with UEs 715 through a number of other access network transmission entities, which may be referred to as a radio head, a smart radio head, or a transmission/reception point (TRP). In some configurations, various functions of each access network entity or base station 705 may be distributed across various network devices (e.g., radio heads and access network controllers) or consolidated into a single network device (e.g., a base station 705).

Wireless communications system 700 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 715 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 700 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 700 may also operate in an extremely high frequency (EHF) region of the spectrum (e.g., from 30 GHz to 300 GHz), also known as the millimeter band. In some examples, wireless communications system 700 may support millimeter wave (mmW) communications between UEs 715 and base stations 705, and EHF antennas of the respective devices may be even smaller and more closely spaced than UHF antennas. In some cases, this may facilitate use of antenna arrays within a UE 715. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 700 may utilize both licensed and unlicensed radio frequency spectrum bands. For example, wireless communications system 700 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 705 and UEs 715 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 705 or UE 715 may be equipped with multiple antennas, which may be used to employ techniques such as transmit diversity, receive diversity, multiple-input multiple-output (MIMO) communications, or beamforming. For example, wireless communications system 700 may use a transmission scheme between a transmitting device (e.g., a base station 705) and a receiving device (e.g., a UE 715), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 705 or a UE 715) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 705 may use multiple antennas or antenna arrays to conduct beamforming operations for directional communications with a UE 715. For instance, some signals (e.g. synchronization signals, reference signals, beam selection signals, or other control signals) may be transmitted by a base station 705 multiple times in different directions, which may include a signal being transmitted according to different beamforming weight sets associated with different directions of transmission. Transmissions in different beam directions may be used to identify (e.g., by the base station 705 or a receiving device, such as a UE 715) a beam direction for subsequent transmission and/or reception by the base station 705.

Some signals, such as data signals associated with a particular receiving device, may be transmitted by a base station 705 in a single beam direction (e.g., a direction associated with the receiving device, such as a UE 715). In some examples, the beam direction associated with transmissions along a single beam direction may be determined based at least in in part on a signal that was transmitted in different beam directions. For example, a UE 715 may receive one or more of the signals transmitted by the base station 705 in different directions, and the UE 715 may report to the base station 705 an indication of the signal it received with a highest signal quality, or an otherwise acceptable signal quality. Although these techniques are described with reference to signals transmitted in one or more directions by a base station 705, a UE 715 may employ similar techniques for transmitting signals multiple times in different directions (e.g., for identifying a beam direction for subsequent transmission or reception by the UE 715), or transmitting a signal in a single direction (e.g., for transmitting data to a receiving device).

A receiving device (e.g., a UE 715, which may be an example of a mmW receiving device) may try multiple receive beams when receiving various signals from the base station 705, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 705 or UE 715 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 705 may be located in diverse geographic locations. A base station 705 may have an antenna array with a number of rows and columns of antenna ports that the base station 705 may use to support beamforming of communications with a UE 715. Likewise, a UE 715 may have one or more antenna arrays that may support various MIMO or beamforming operations.

In some cases, wireless communications system 700 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 715 and a base station 705 or core network 730 supporting radio bearers for user plane data. At the Physical layer, transport channels may be mapped to physical channels.

In some cases, UEs 715 and base stations 705 may support retransmissions of data to increase the likelihood that data is received successfully. HARQ feedback is one technique of increasing the likelihood that data is received correctly over a communication link 725. HARQ may include a combination of error detection (e.g., using a cyclic redundancy check (CRC)), forward error correction (FEC), and retransmission (e.g., automatic repeat request (ARQ)).

HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 715 and a base station 705.

The term "carrier" refers to a set of radio frequency spectrum resources having a defined physical layer structure for supporting communications over a communication link 725. For example, a carrier of a communication link 725 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 715. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 700. For example, the carrier bandwidth may be one of a number of predetermined bandwidths for carriers of a particular radio access technology (e.g., 1.4, 3, 5, 10, 15, 20, 40, or 80 MHz). In some examples, each served UE 715 may be configured for operating over portions or all of the carrier bandwidth. In other examples, some UEs 715 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 715 receives and the higher the order of the modulation scheme, the higher the data rate may be for the UE 715. In MIMO systems, a wireless communications resource may refer to a combination of a radio frequency spectrum resource, a time resource, and a spatial resource (e.g., spatial layers), and the use of multiple spatial layers may further increase the data rate for communications with a UE 715.

Devices of the wireless communications system 700 (e.g., base stations 705 or UEs 715) may have a hardware configuration that supports communications over a particular carrier bandwidth, or may be configurable to support communications over one of a set of carrier bandwidths. In some examples, the wireless communications system 700 may include base stations 705 and/or UEs 715 that support simultaneous communications via carriers associated with more than one different carrier bandwidth.

Wireless communications system 700 may support communication with a UE 715 on multiple cells or carriers, a feature which may be referred to as carrier aggregation or multi-carrier operation. A UE 715 may be configured with multiple downlink component carriers and one or more uplink component carriers according to a carrier aggregation configuration. Carrier aggregation may be used with both FDD and TDD component carriers.

In some cases, wireless communications system 700 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 715 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 715 or base station 705, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 700 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 8:
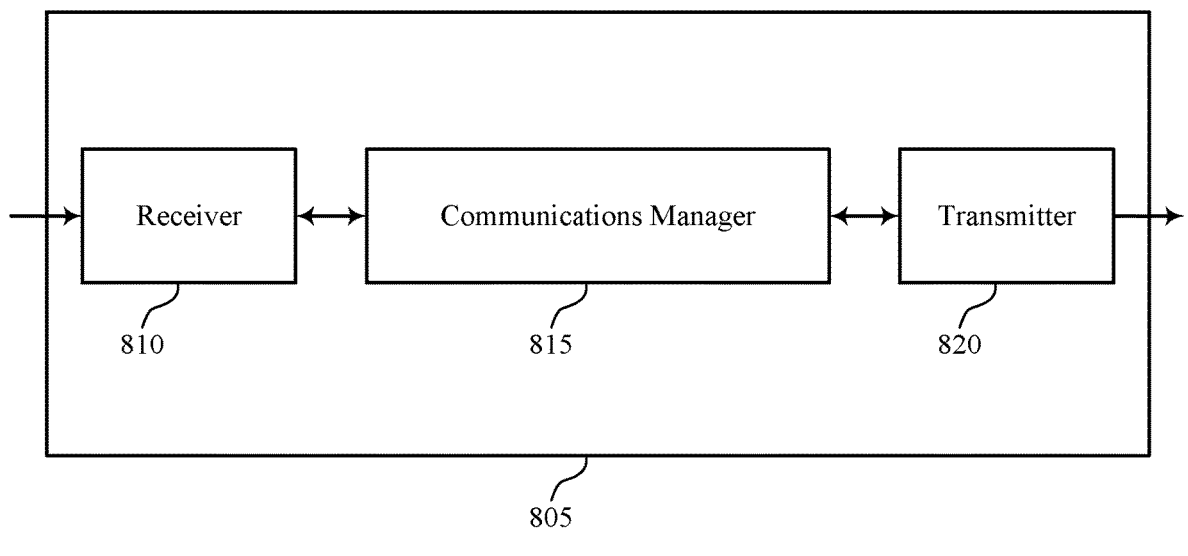
FIGS. 8 and 9 show block diagrams of devices that support aggregate data provenance in accordance with aspects of the present disclosure.

FIG. 8 shows a block diagram 800 of a device 805 that supports aggregate data provenance in accordance with aspects of the present disclosure. The device 805 may be an example of aspects of a device as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to aggregate data provenance, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify that the device is to provide collective data provenance information for data generated at the device and at other devices, with a first portion of the data being generated at the device and with additional portions of the data being generated at the other devices, and also may receive a group profile which identifies the other devices to be included in collective data provenance generation with the device. The communications manager 815 may receive, from a node associated with an owner of the device and of the other devices, a set of evaluation parameters for generating collective data provenance information, the set of evaluation parameters being independent of the first portion of the data and the additional portions of the data, and may generate a device specific output of the collective data provenance information based on the first portion of the data and on the set of evaluation parameters. Additionally, the communications manager 815 may generate a collective data verification parameter. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the data configuration manager 815 as described herein may be implemented to realize one or more potential advantages. One implementation may allow a device 805 to provide improved quality and reliability of service at the device 805 by ensuring the authenticity of data.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
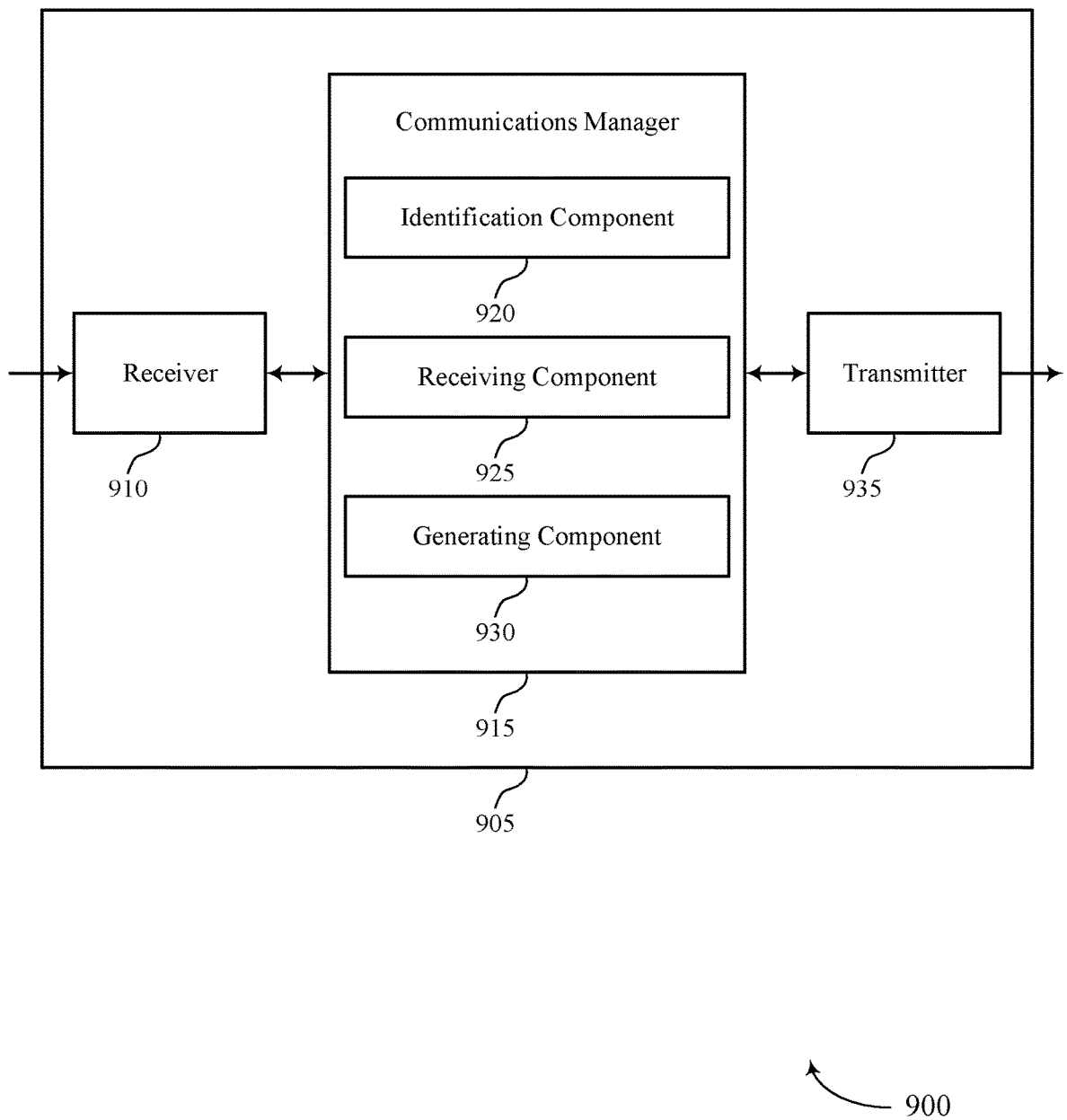

FIG. 9 shows a block diagram 900 of a device 905 that supports aggregate data provenance in accordance with aspects of the present disclosure. The device 905 may be an example of aspects of a device 805 or a device 715 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to aggregate data provenance, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 1105 as described herein. The communications manager 915 may include an identification component 920, a receiving component 925, and a generating component 930. The communications manager 915 may be an example of aspects of the communications manager 1105 described herein.

The identification component 920 may identify that the device is to provide collective data provenance information for data generated at the device and at other devices, with a first portion of the data being generated at the device and with additional portions of the data being generated at the other devices.

The receiving component 925 may receive a group profile which identifies the other devices to be included in collective data provenance generation with the device. Further, the receiving component 925 may receive, from a node associated with an owner of the device and of the other devices, a set of evaluation parameters for generating collective data provenance information, the set of evaluation parameters being independent of the first portion of the data and the additional portions of the data.

The generating component 930 may generate a device specific output of the collective data provenance information based on the first portion of the data and on the set of evaluation parameters and generate a collective data verification parameter.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
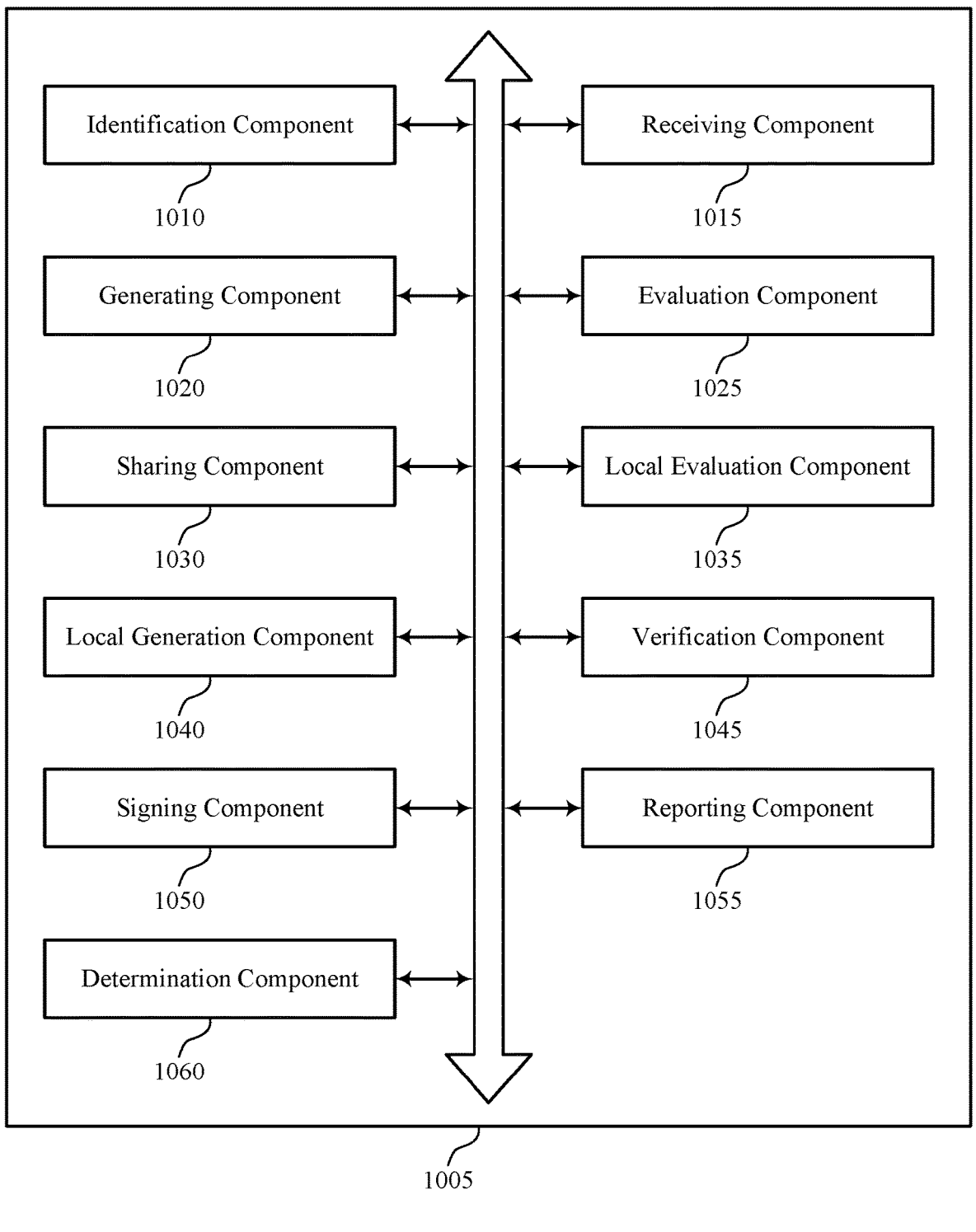
FIG. 10 shows a block diagram of a communications manager that supports aggregate data provenance in accordance with aspects of the present disclosure.

FIG. 10 shows a block diagram 1000 of a communications manager 1005 that supports aggregate data provenance in accordance with aspects of the present disclosure. The communications manager 1005 may be an example of aspects of a communications manager 815, a communications manager 915, or a communications manager 1110 described herein. The communications manager 1005 may include an identification component 1010, a receiving component 1015, a generating component 1020, an evaluation component 1025, a sharing component 1030, a local evaluation component 1035, a local generation component 1040, a verification component 1045, a signing component 1050, a reporting component 1055, and a determination component 1060. Each of these modules may communicate, directly or indirectly, with one another (e.g., via one or more buses).

The identification component 1010 may identify that the device is to provide collective data provenance information for data generated at the device and at other devices, with a first portion of the data being generated at the device and with additional portions of the data being generated at the other devices. In some examples, the identification component 1010 may identify that a predetermined event has occurred, where the predetermined event triggers producing an output at each of the devices. In some examples, the identification component 1010 may identify group profile parameters used for generating collective data at the devices.

The receiving component 1015 may receive a group profile which identifies the other devices to be included in collective data provenance generation with the device. In some examples, the receiving component 1015 may receive, from a node associated with an owner of the device and of the other devices, a set of evaluation parameters for generating collective data provenance information, the set of evaluation parameters being independent of the first portion of the data and the additional portions of the data.

In some examples, the receiving component 1015 may receive, at the device, a shared random parameter, a MAC key parameter, and a MAC on the shared random parameter. In some examples, the receiving component 1015 may receive, from the node, an indication to generate an output at each of the devices.

The generating component 1020 may generate a device specific output of the collective data provenance information based on the first portion of the data and on the set of evaluation parameters. In some examples, the generating component 1020 may generate a collective data verification parameter. In some examples, the generating component 1020 may generate the output that is a sum of individual values at each of the devices, based on receiving the indication to produce the output at each of the devices.

The evaluation component 1025 may evaluate a function at the device to produce an output, by using the received evaluation parameters, based on the first portion of the data being generated at the device.

The sharing component 1030 may share the function evaluated at the device and between each of the devices, based on evaluating the function at the device. In some examples, the sharing component 1030 may share, at the device and between each of the devices, at least one of the received evaluation parameters for the device, based on sharing the function evaluated at the device. In some examples, the sharing component 1030 may share, at the device and between each of the devices, each of the locally generated MAC shares. Additionally, in some examples, the sharing component 1030 may share at least one of the received evaluation parameters for the other devices.

The local evaluation component 1035 may locally evaluate the function at each of the devices to produce respective outputs, based on the shared evaluated function at the device and the locally received evaluation parameters at each of the devices.

The local generation component 1040 may locally generate a MAC share at each of the devices by using the locally received evaluation parameters for each of the devices.

The verification component 1045 may verify an authenticity of the data collectively generated by each of the devices by combining each of the outputs of the functions evaluated at each of the devices, based at least in part on the collective data verification parameter.

The signing component 1050 may sign the data using the collective data provenance information.

The reporting component 1055 may report the data signed with the collective data provenance information, to a server.

The determination component 1060 may determine, based on the identified group profile parameters, how the device and the other devices are to generate collective data provenance information.

Figure 11:
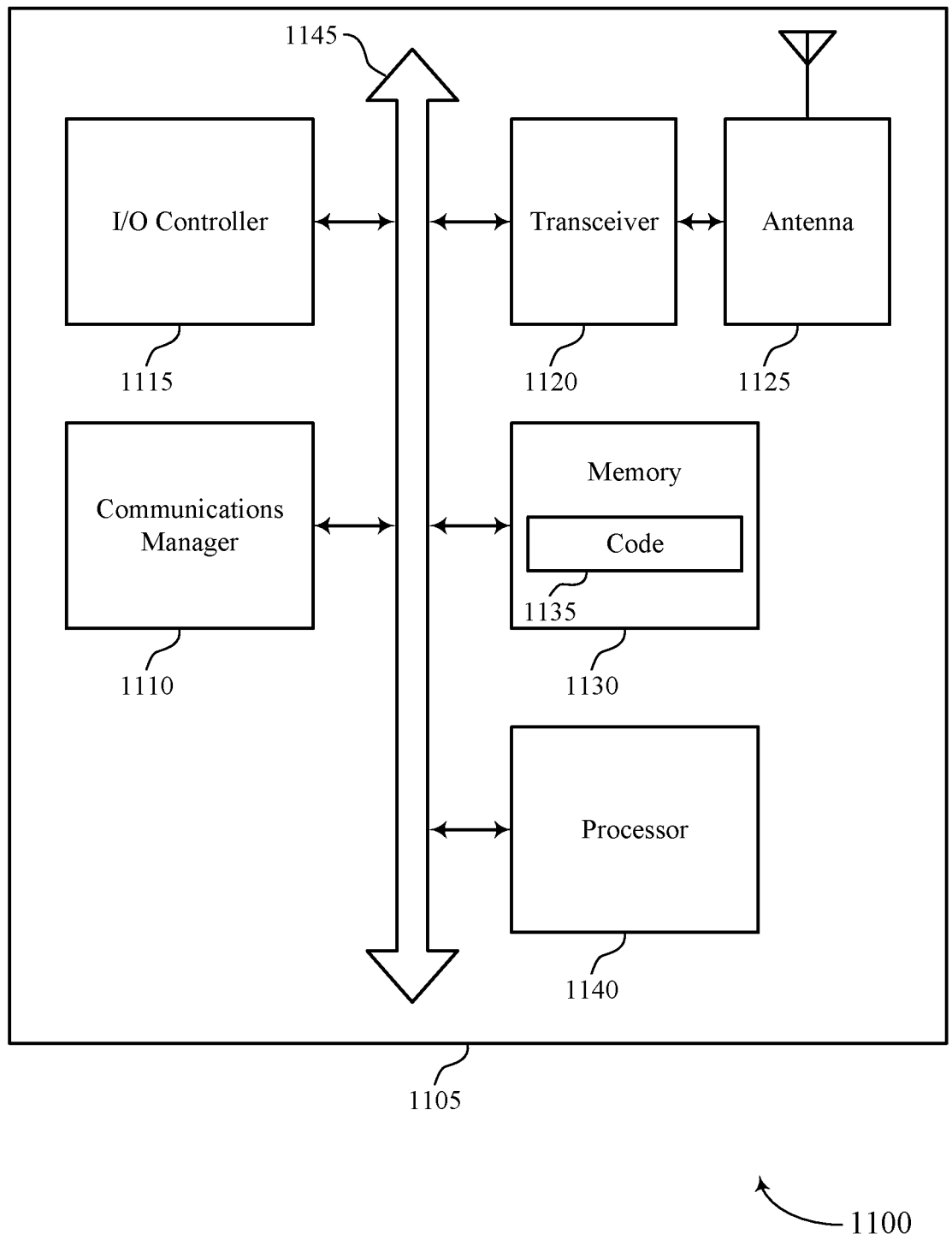
FIG. 11 shows a diagram of a system including a device that supports aggregate data provenance in accordance with aspects of the present disclosure.

FIG. 11 shows a diagram of a system 1100 including a device 1105 that supports aggregate data provenance in accordance with aspects of the present disclosure. The device 1105 may be an example of or include the components of device 905, device 1005, or a device as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify that the device is to provide collective data provenance information for data generated at the device and at other devices, with a first portion of the data being generated at the device and with additional portions of the data being generated at the other devices and may also receive a group profile which identifies the other devices to be included in collective data provenance generation with the device. The communications manager 1110 may receive, from a node associated with an owner of the device and of the other devices, a set of evaluation parameters for generating collective data provenance information, the set of evaluation parameters being independent of the first portion of the data and the additional portions of the data and also may generate a device specific output of the collective data provenance information based on the first portion of the data and on the set of evaluation parameters. Additionally, the communications manager 1110 may generate a collective data verification parameter.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting aggregate data provenance).

Based on processes for supporting data provenance, the processor 1140 may efficiently determine the authenticity of data which may in turn improve reliability of service. As such, the processor 1140 may be ready to respond more efficiently through the reduction of a ramp up in processing power.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
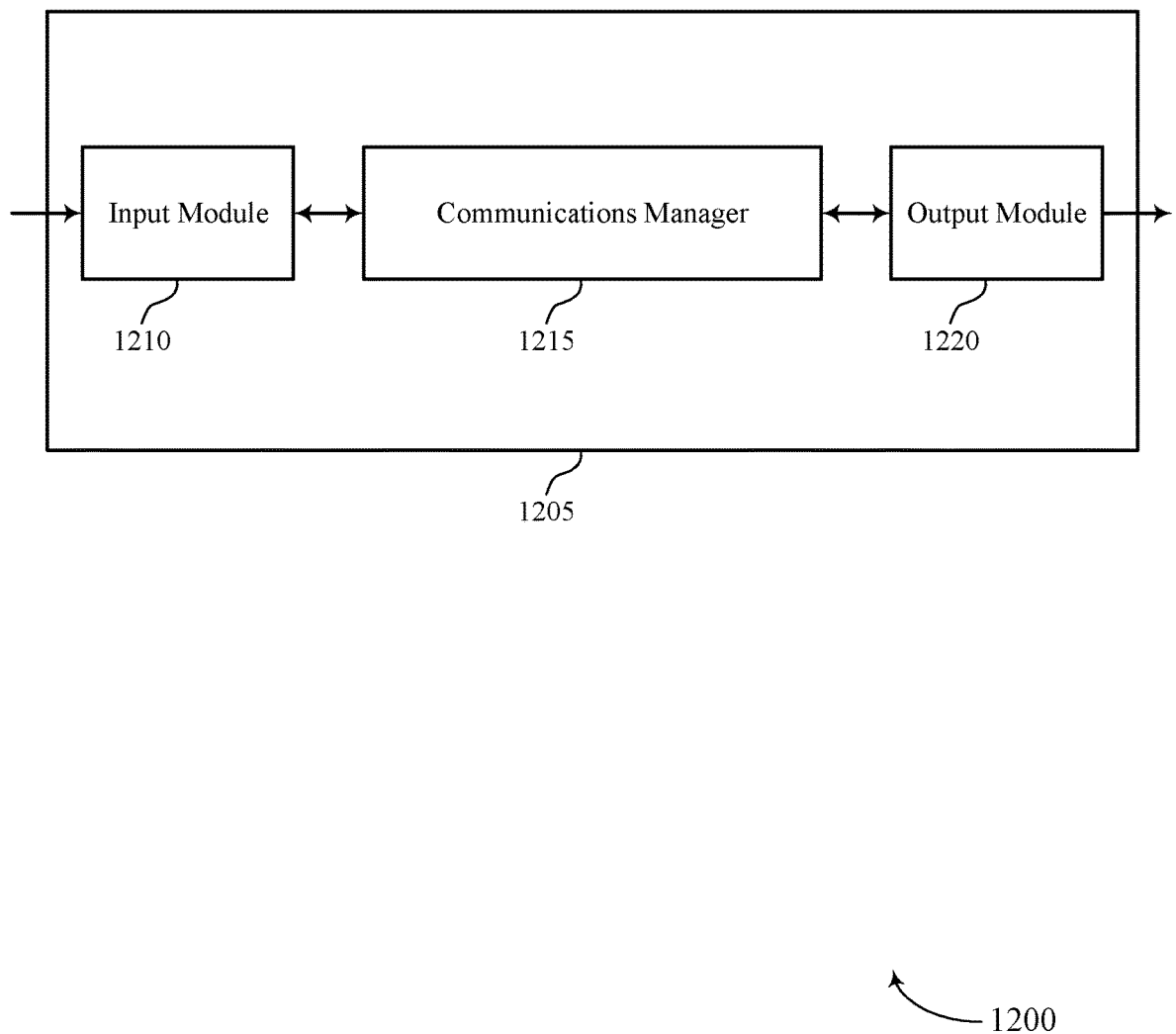
FIGS. 12 and 13 show block diagrams of devices that support aggregate data provenance in accordance with aspects of the present disclosure.

FIG. 12 shows a block diagram 1200 of a device 1205 that supports aggregate data provenance in accordance with aspects of the present disclosure. The device 1205 may be an example of aspects of a master node as described herein. The device 1205 may include an input module 1210, a communications manager 1215, and an output module 1220. The device 1205 may also include a processor. Each of these components may be in communication with one another (e.g., via one or more buses).

The input module 1210 may manage input signals for the apparatus 1205. For example, the input module 1210 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 1210 may send aspects of these input signals to other components of the apparatus 1205 for processing. For example, the input module 1210 may transmit input signals to the communications manager 1215 to support Aggregate Data Provenance. In some cases, the input module 1210 may be a component of an input/output (I/O) controller 1115 as described with reference to FIG. 11.

The communications manager 1215 may identify a device group, for collectively providing data provenance information for data generated at the device group, to a third party, may provision a group profile, from the node, to the device group, and may provision, to the device group, a set of evaluation parameters for generating collective data provenance information, the set of evaluation parameters being independent of the individual portions of the data. Additionally, the communications manager 1215 may receive, at the node, data from the device group, with individual portions of the data being generated at individual devices. The communications manager 1215 may be an example of aspects of the communications manager 1110 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the data configuration manager 1215 as described herein may be implemented to realize one or more potential advantages. One implementation may allow a device 1205 to provide improved quality and reliability of service at the device 1205 by ensuring the authenticity of data.

The output module 1220 may manage output signals for the apparatus 1205. For example, the output module 1220 may receive signals from other components of the apparatus 1205, such as the communications manager 1215, and may transmit these signals to other components or devices. In some specific examples, the output module 1220 may transmit output signals for display in a user interface, for storage in a database or data store, for further processing at a server or server cluster, or for any other processes at any number of devices or systems. In some cases, the output module 1220 may be a component of an I/O controller 1115 as described with reference to FIG. 11.

Figure 13:
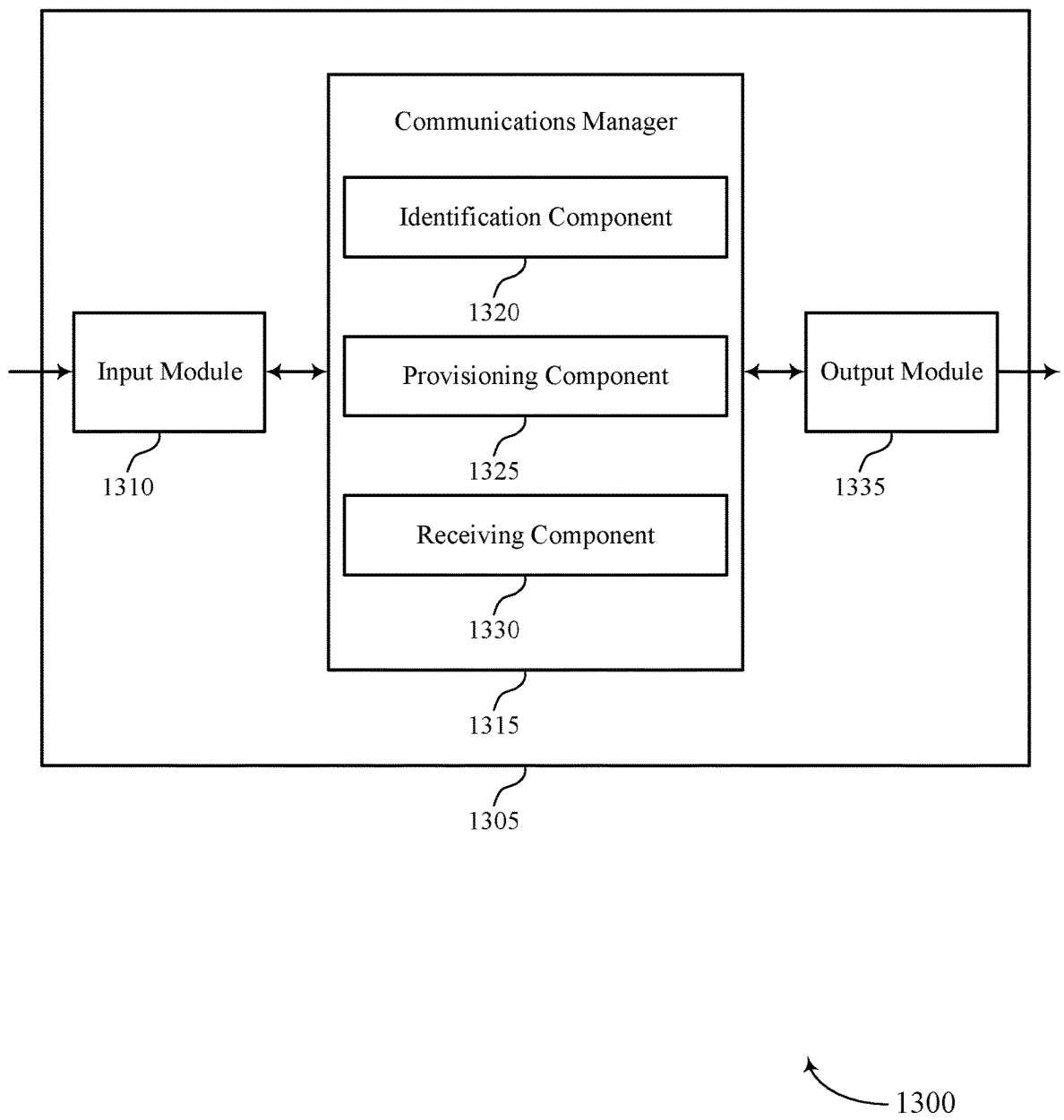

FIG. 13 shows a block diagram 1300 of a device 1305 that supports aggregate data provenance in accordance with aspects of the present disclosure. The device 1305 may be an example of aspects of a device 1205 or a master node 115 as described herein. The device 1305 may include an input module 1310, a communications manager 1315, and an output module 1335. The device 1305 may also include a processor. Each of these components may be in communication with one another (e.g., via one or more buses).

The input module 1310 may manage input signals for the apparatus 1305. For example, the input module 1310 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 1310 may send aspects of these input signals to other components of the apparatus 1305 for processing. For example, the input module 1310 may transmit input signals to the communications manager 1315 to support Aggregate Data Provenance. In some cases, the input module 1310 may be a component of an input/output (I/O) controller 1115 as described with reference to FIG. 11.

The communications manager 1315 may be an example of aspects of the communications manager 1215 as described herein. The communications manager 1315 may include an identification component 1320, a provisioning component 1325, and a receiving component 1430. The communications manager 1315 may be an example of aspects of the communications manager 1110 described herein.

The identification component 1320 may identify a device group, for collectively providing data provenance information for data generated at the device group, to a third party.

The provisioning component 1325 may provision a group profile, from the node, to the device group and provision, to the device group, a set of evaluation parameters for generating collective data provenance information, the set of evaluation parameters being independent of the individual portions of the data.

The receiving component 1330 may receive, at the node, data from the device group, with individual portions of the data being generated at individual devices.

The output module 1335 may manage output signals for the apparatus 1305. For example, the output module 1335 may receive signals from other components of the apparatus 1305, such as the communications manager 1315, and may transmit these signals to other components or devices. In some specific examples, the output module 1335 may transmit output signals for display in a user interface, for storage in a database or data store, for further processing at a server or server cluster, or for any other processes at any number of devices or systems. In some cases, the output module 1335 may be a component of an I/O controller 1115 as described with reference to FIG. 11.

Figure 14:
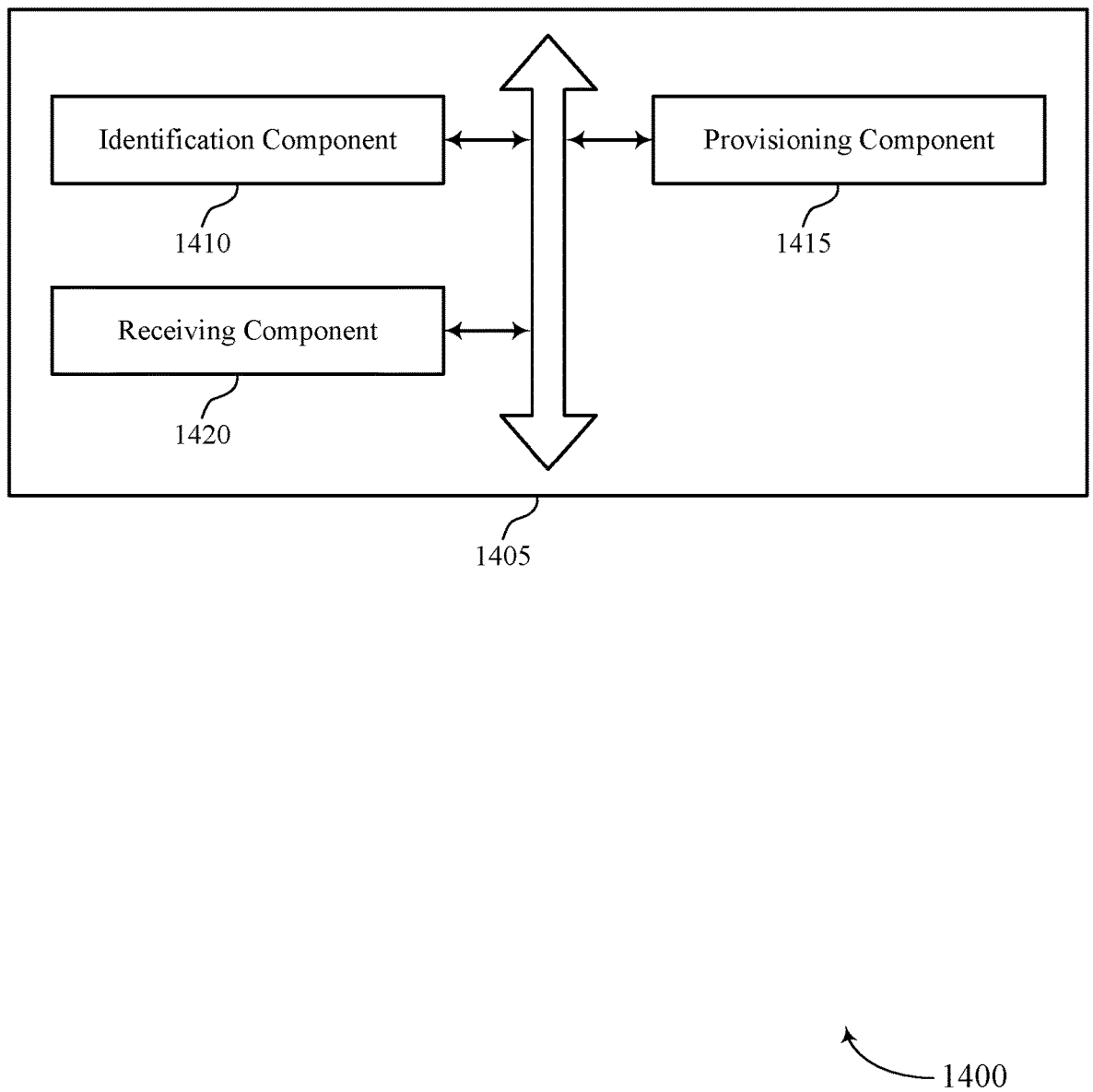
FIG. 14 shows a block diagram of a communications manager that supports aggregate data provenance in accordance with aspects of the present disclosure.

FIG. 14 shows a block diagram 1400 of a communications manager 1405 that supports aggregate data provenance in accordance with aspects of the present disclosure. The communications manager 1405 may be an example of aspects of a communications manager 1215, a communications manager 1315, or a communications manager 1110 described herein. The communications manager 1405 may include an identification component 1410, a provisioning component 1415, and a receiving component 1420. Each of these modules may communicate, directly or indirectly, with one another (e.g., via one or more buses).

The identification component 1410 may identify a device group, for collectively providing data provenance information for data generated at the device group, to a third party.

The provisioning component 1415 may provision a group profile, from the node, to the device group. In some examples, the provisioning component 1415 may provision, to the device group, a set of evaluation parameters for generating collective data provenance information, the set of evaluation parameters being independent of the individual portions of the data.

In some examples, the provisioning component 1415 may provision, to the device group, at least one of a group identity, a device index, a member list, group credentials, or a function for evaluating the collective data provenance information of the data generated at the device group. In some examples, the provisioning component 1415 may provision, to the device group, at least one of a message authentication code (MAC) share, a MAC key share, or a shared random parameter.

The receiving component 1420 may receive, at the node, data from the device group, with individual portions of the data being generated at individual devices.

Figure 15:
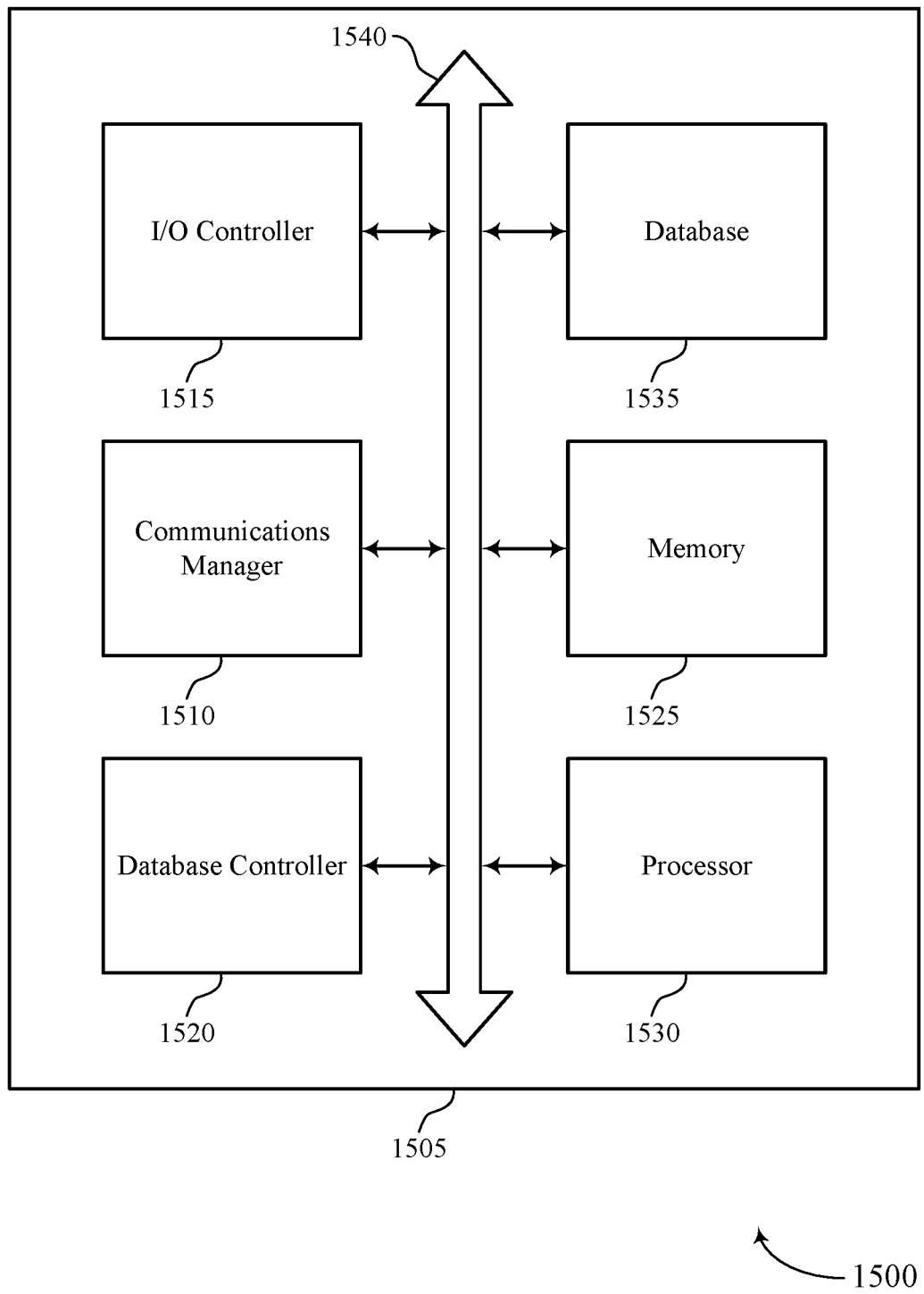
FIG. 15 shows a diagram of a system including a device that supports aggregate data provenance in accordance with aspects of the present disclosure.

FIG. 15 shows a diagram of a system 1500 including a device 1505 that supports aggregate data provenance in accordance with aspects of the present disclosure. The device 1505 may be an example of or include the components of device 1205, device 1305, or a master node as described herein. The device 1505 may include components for bi-directional voice and data communications including components for transmitting and receiving communications, including a communications manager 1510, an I/O controller 1515, a database controller 1520, memory 1525, a processor 1530, and a database 1535. These components may be in electronic communication via one or more buses (e.g., bus 1540).

The communications manager 1510 may identify a device group, for collectively providing data provenance information for data generated at the device group, to a third party, and may also provision a group profile, from the node, to the device group. The communications manager 1510 may provision, to the device group, a set of evaluation parameters for generating collective data provenance information, the set of evaluation parameters being independent of the individual portions of the data. Additionally, the communications manager 1510 may receive, at the node, data from the device group, with individual portions of the data being generated at individual devices.

The I/O controller 1515 may manage input signals 1545 and output signals 1550 for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The database controller 1520 may manage data storage and processing in a database 1535. In some cases, a user may interact with the database controller 1520. In other cases, the database controller 1520 may operate automatically without user interaction. The database 1535 may be an example of a single database, a distributed database, multiple distributed databases, a data store, a data lake, or an emergency backup database.

Memory 1525 may include random-access memory (RAM) and read-only memory (ROM). The memory 1525 may store computer-readable, computer-executable software including instructions that, when executed, cause the processor to perform various functions described herein. In some cases, the memory 1525 may contain, among other things, a basic input/output system (BIOS) which may control basic hardware or software operation such as the interaction with peripheral components or devices.

The processor 1530 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1530 may be configured to operate a memory array using a memory controller. In other cases, a memory controller may be integrated into the processor 1530. The processor 1530 may be configured to execute computer-readable instructions stored in a memory 1525 to perform various functions (e.g., functions or tasks supporting aggregate data provenance).

Based on processes for supporting data provenance, the processor 1530 may efficiently determine the authenticity of data which may in turn improve reliability of service. As such, the processor 1530 may be ready to respond more efficiently through the reduction of a ramp up in processing power.

Figure 16:
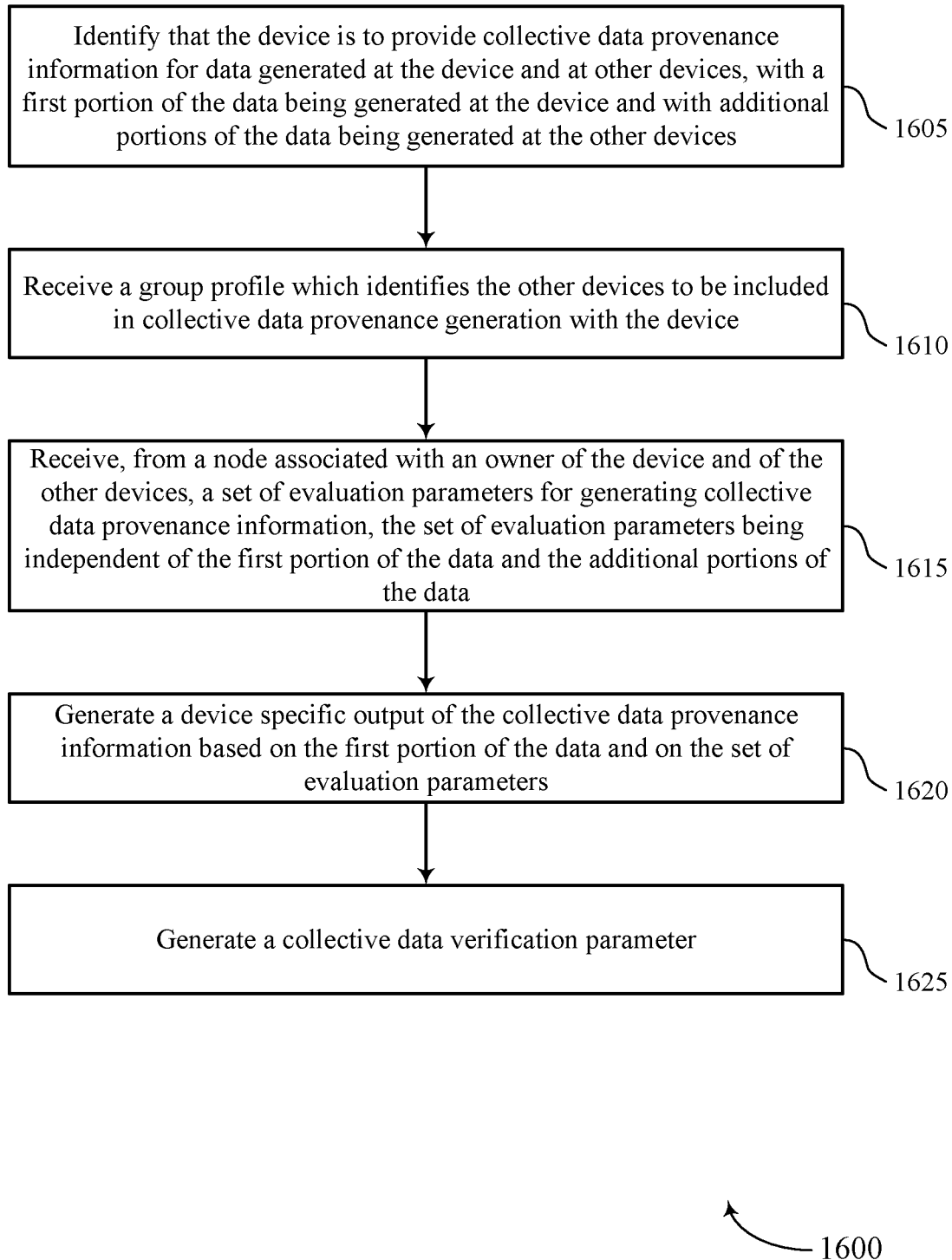
FIGS. 16 and 17 show flowcharts illustrating methods that support aggregate data provenance in accordance with aspects of the present disclosure.

FIG. 16 shows a flowchart illustrating a method 1600 that supports aggregate data provenance in accordance with aspects of the present disclosure. The operations of method 1600 may be implemented by a device or its components as described herein. For example, the operations of method 1600 may be performed by a communications manager as described with reference to FIGS. 8 through 11. In some examples, a device may execute a set of instructions to control the functional elements of the device to perform the functions described below. Additionally or alternatively, a device may perform aspects of the functions described below using special-purpose hardware.

At 1605, the device may identify that the device is to provide collective data provenance information for data generated at the device and at other devices, with a first portion of the data being generated at the device and with additional portions of the data being generated at the other devices. The operations of 1605 may be performed according to the methods described herein. In some examples, aspects of the operations of 1605 may be performed by an identification component as described with reference to FIGS. 8 through 11.

At 1610, the device may receive a group profile which identifies the other devices to be included in collective data provenance generation with the device. The operations of 1610 may be performed according to the methods described herein. In some examples, aspects of the operations of 1610 may be performed by a receiving component as described with reference to FIGS. 8 through 11.

At 1615, the device may receive, from a node associated with an owner of the device and of the other devices, a set of evaluation parameters for generating collective data provenance information, the set of evaluation parameters being independent of the first portion of the data and the additional portions of the data. The operations of 1615 may be performed according to the methods described herein. In some examples, aspects of the operations of 1615 may be performed by a receiving component as described with reference to FIGS. 8 through 11.

At 1620, the device may generate a device specific output of the collective data provenance information based on the first portion of the data and on the set of evaluation parameters. The operations of 1620 may be performed according to the methods described herein. In some examples, aspects of the operations of 1620 may be performed by a generating component as described with reference to FIGS. 8 through 11.

At 1625, the device may generate a collective data verification parameter. The operations of 1625 may be performed according to the methods described herein. In some examples, aspects of the operations of 1625 may be performed by a generating component as described with reference to FIGS. 8 through 11.

Figure 17:
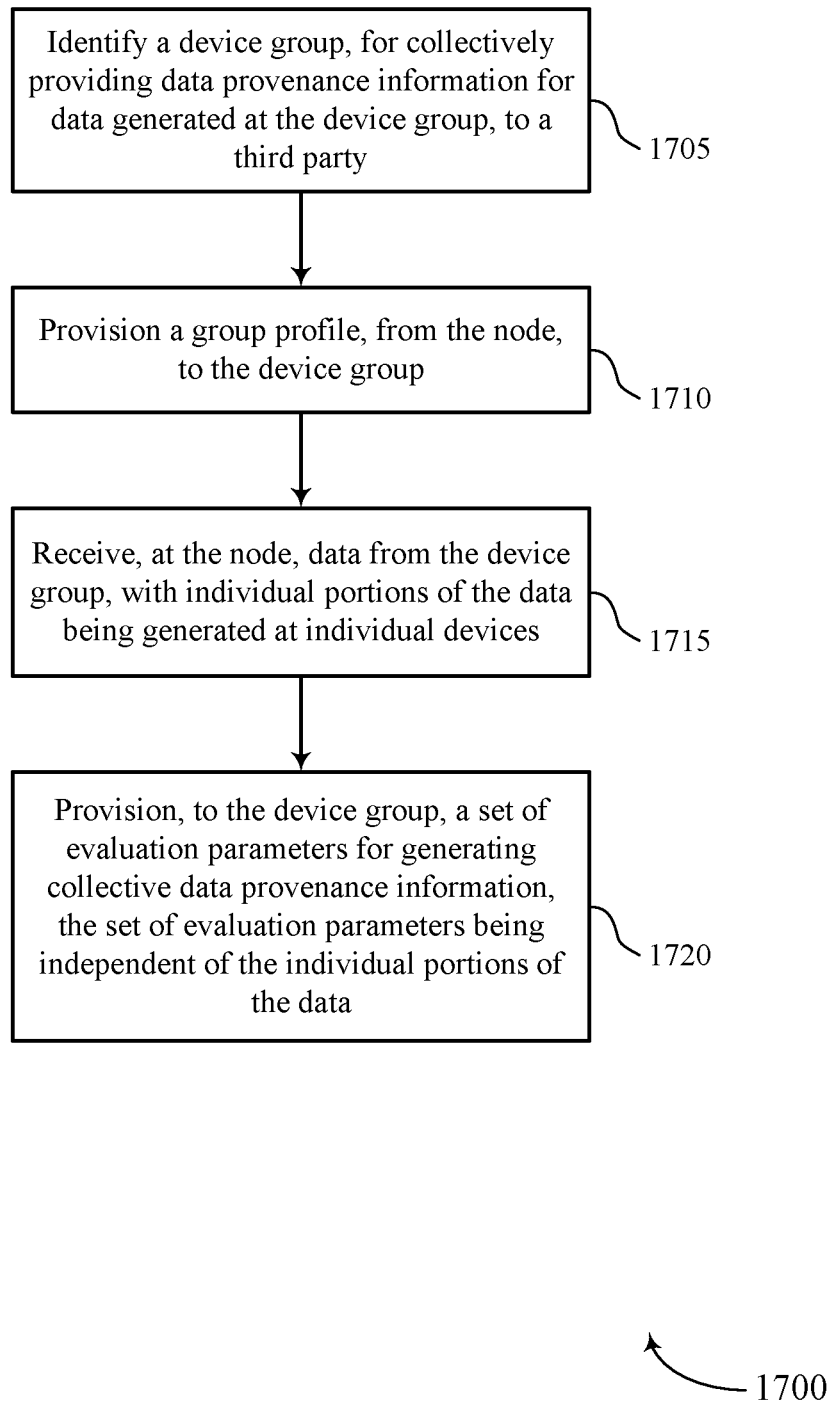

FIG. 17 shows a flowchart illustrating a method 1700 that supports aggregate data provenance in accordance with aspects of the present disclosure. The operations of method 1700 may be implemented by a node or its components as described herein. For example, the operations of method 1700 may be performed by a communications manager as described with reference to FIGS. 12 through 15. In some examples, a node may execute a set of instructions to control the functional elements of the node to perform the functions described below. Additionally or alternatively, a node may perform aspects of the functions described below using special-purpose hardware.

At 1705, the node may identify a device group, for collectively providing data provenance information for data generated at the device group, to a third party. The operations of 1705 may be performed according to the methods described herein. In some examples, aspects of the operations of 1705 may be performed by an identification component as described with reference to FIGS. 12 through 15.

At 1710, the node may provision a group profile, from the node, to the device group. The operations of 1710 may be performed according to the methods described herein. In some examples, aspects of the operations of 1710 may be performed by a provisioning component as described with reference to FIGS. 12 through 15.

At 1715, the node may receive, at the node, data from the device group, with individual portions of the data being generated at individual devices. The operations of 1715 may be performed according to the methods described herein. In some examples, aspects of the operations of 1715 may be performed by a receiving component as described with reference to FIGS. 12 through 15.

At 1720, the node may provision, to the device group, a set of evaluation parameters for generating collective data provenance information, the set of evaluation parameters being independent of the individual portions of the data. The operations of 1720 may be performed according to the methods described herein. In some examples, aspects of the operations of 1720 may be performed by a provisioning component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication at a device, comprising:
   identifying that the device is to provide collective data provenance information for data generated at the device and at other devices, with a first portion of the data being generated at the device and with additional portions of the data being generated at the other devices;
   receiving a group profile which identifies the other devices to be included in collective data provenance generation with the device;
   receiving, from a node associated with an owner of the device and of the other devices, a plurality of evaluation parameters for generating collective data provenance information, the plurality of evaluation parameters being independent of the first portion of the data and the additional portions of the data;
   generating a device specific output of the collective data provenance information based at least in part on the first portion of the data, the plurality of evaluation parameters, and the group profile; and
   generating a collective data verification parameter based at least in part on verification of the generated device specific output.

2. The method of claim 1, wherein receiving the plurality of evaluation parameters further comprises:
   receiving, at the device, a shared random parameter, a message authentication code (MAC) key parameter, and a MAC on the shared random parameter.

3. The method of claim 1, wherein identifying that the device is to provide collective data provenance information further comprises:
   receiving, from the node, an indication to generate an output at each of the devices; and
   generating the output that is a sum of individual values at each of the devices, based at least in part on receiving the indication to produce the output at each of the devices.

4. The method of claim 1, wherein identifying that the device is to provide collective data provenance information further comprises:
   identifying that a predetermined event has occurred, wherein the predetermined event triggers producing an output at each of the devices.

5. The method of claim 1, further comprising:
   evaluating a function at the device to produce an output, by using the received evaluation parameters, based at least in part on the first portion of the data being generated at the device.

6. The method of claim 5, further comprising:
   sharing the function evaluated at the device and between each of the devices, based at least in part on evaluating the function at the device;
   sharing, at the device and between each of the devices, at least one of the received evaluation parameters for the device, based at least in part on sharing the function evaluated at the device; and
   locally evaluating the function at each of the devices to produce respective outputs, based at least in part on the shared evaluated function at the device and the locally received evaluation parameters at each of the devices.

7. The method of claim 6, wherein the receiving the plurality of evaluation parameters being independent of the first portion of the data and the additional portions of the data, further comprises:

locally generating a message authentication code (MAC) share at each of the devices by using the locally received evaluation parameters for each of the devices; and sharing, at the device and between each of the devices, each of the locally generated MAC shares; and sharing at least one of the received evaluation parameters for the other devices.

8. The method of claim 7, further comprising:

verifying an authenticity of the data collectively generated by each of the devices by combining each of the outputs of the functions evaluated at each of the devices, based at least in part on the collective data verification parameter.

9. The method of claim 8, further comprising:

signing the data using the collective data provenance information.

10. The method of claim 9, further comprising:

reporting the data signed with the collective data provenance information, to a server.

11. The method of claim 1, wherein receiving the group profile further comprises:

identifying group profile parameters used for generating collective data at the devices; and determining, based at least in part on the identified group profile parameters, how the device and the other devices are to generate collective data provenance information.

12. The method of claim 1, wherein the collective data verification parameter comprises a message authentication code (MAC) share of the device and a plurality of assessment parameters.

13. A method for communication at a node, comprising:

identifying a device group, for collectively providing data provenance information for data generated at the device group, to a third party;

provisioning a group profile, from the node, to the device group;

receiving, at the node, data from the device group, with individual portions of the data being generated at individual devices; and provisioning, to the device group, a plurality of evaluation parameters for generating collective data provenance information, the plurality of evaluation parameters being independent of the individual portions of the data, wherein the plurality of evaluation parameters comprise a shared random parameter, a MAC key parameter, and a MAC on the shared random parameter.

14. The method of claim 13, wherein provisioning the group profile further comprises:

provisioning, to the device group, at least one of a group identity, a member list, group credentials, or a function for evaluating the collective data provenance information of the data generated at the device group.

15. An apparatus for communication at a device, comprising:

a processor, memory in electronic communication with the processor; and instructions stored in the memory and executable by the processor to cause the apparatus to:

identify that the device is to provide collective data provenance information for data generated at the device and at other devices, with a first portion of the data being generated at the device and with additional portions of the data being generated at the other devices;

receive a group profile which identifies the other devices to be included in collective data provenance generation with the device;

receive, from a node associated with an owner of the device and of the other devices, a plurality of evaluation parameters for generating collective data provenance information, the plurality of evaluation parameters being independent of the first portion of the data and the additional portions of the data;

generate a device specific output of the collective data provenance information based at least in part on the first portion of the data, the plurality of evaluation parameters, and the group profile; and generate a collective data verification parameter based at least in part on verification of the generated device specific output.

16. The apparatus of claim 15, wherein the instructions to receive the plurality of evaluation parameters further are executable by the processor to cause the apparatus to:

receive, at the device, a shared random parameter, a MAC key parameter, and a MAC on the shared random parameter.

17. The apparatus of claim 15, wherein the instructions to identify that the device is to provide collective data provenance information further are executable by the processor to cause the apparatus to:

receive, from the node, an indication to generate an output at each of the devices; and generate the output that is a sum of individual values at each of the devices, based at least in part on receiving the indication to produce the output at each of the devices.

18. The apparatus of claim 15, wherein the instructions to identify that the device is to provide collective data provenance information further are executable by the processor to cause the apparatus to:

identify that a predetermined event has occurred, wherein the predetermined event triggers producing an output at each of the devices.

19. The apparatus of claim 15, wherein the instructions are further executable by the processor to cause the apparatus to:

evaluate a function at the device to produce an output, by using the received evaluation parameters, based at least in part on the first portion of the data being generated at the device.

20. The apparatus of claim 19, wherein the instructions are further executable by the processor to cause the apparatus to:

share the function evaluated at the device and between each of the devices, based at least in part on evaluating the function at the device;

share, at the device and between each of the devices, at least one of the received evaluation parameters for the device, based at least in part on sharing the function evaluated at the device; and locally evaluate the function at each of the devices to produce respective outputs, based at least in part on the shared evaluated function at the device and the locally received evaluation parameters at each of the devices.

21. The apparatus of claim 20, wherein the receiving the plurality of evaluation parameters being independent of the first portion of the data and the additional portions of the data, further comprises:
    locally generate a MAC share at each of the devices by using the locally received evaluation parameters for each of the devices;
    share, at the device and between each of the devices, each of the locally generated MAC shares; and
    share at least one of the received evaluation parameters for the other devices.

22. The apparatus of claim 21, wherein the instructions are further executable by the processor to cause the apparatus to:
    verify an authenticity of the data collectively generated by each of the devices by combining each of the outputs of the functions evaluated at each of the devices, based at least in part on the collective data verification parameter.

23. The apparatus of claim 22, wherein the instructions are further executable by the processor to cause the apparatus to:
    sign the data using the collective data provenance information.

24. The apparatus of claim 23, wherein the instructions are further executable by the processor to cause the apparatus to:
    report the data signed with the collective data provenance information, to a server.

25. The apparatus of claim 15, wherein the instructions to receive the group profile further are executable by the processor to cause the apparatus to:
    identify group profile parameters used for generating collective data at the devices; and
    determine, based at least in part on the identified group profile parameters, how the device and the other devices are to generate collective data provenance information.

26. The apparatus of claim 15, wherein the collective data verification parameter comprises a message authentication code (MAC) share of the device and a plurality of assessment parameters.

27. An apparatus for communication at a node, comprising:
    a processor,
    memory in electronic communication with the processor; and
    instructions stored in the memory and executable by the processor to cause the apparatus to:
        identify a device group, for collectively providing data provenance information for data generated at the device group, to a third party;
        provision a group profile, from the node, to the device group;
        receive, at the node, data from the device group, with individual portions of the data being generated at individual devices; and
        provision, to the device group, a plurality of evaluation parameters for generating collective data provenance information, the plurality of evaluation parameters being independent of the individual portions of the data, wherein the plurality of evaluation parameters comprise a shared random parameter, a MAC key parameter, and a MAC on the shared random parameter.

28. The apparatus of claim 27, wherein the instructions to provision the group profile further are executable by the processor to cause the apparatus to:
    provision, to the device group, at least one of a group identity, a member list, group credentials, or a function for evaluating the collective data provenance information of the data generated at the device group.

* * * * *